US009501337B2

(12) United States Patent
Shapiro

(10) Patent No.: US 9,501,337 B2
(45) Date of Patent: Nov. 22, 2016

(54) SYSTEMS AND METHODS FOR COLLECTING AND DISTRIBUTING A PLURALITY OF NOTIFICATIONS

(75) Inventor: John Shapiro, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1877 days.

(21) Appl. No.: 12/108,892

(22) Filed: Apr. 24, 2008

(65) Prior Publication Data

US 2014/0304714 A1 Oct. 9, 2014

(51) Int. Cl.
*G06F 9/44* (2006.01)
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS

| | | | |
|---|---|---|---|
| 4,870,579 A | 9/1989 | Hey | |
| 4,996,642 A | 2/1991 | Hey | |
| 5,848,397 A * | 12/1998 | Marsh et al. | 705/14.61 |
| 6,377,793 B1 | 4/2002 | Jenkins | |
| 6,480,713 B2 | 11/2002 | Jenkins | |
| 6,681,107 B2 | 1/2004 | Jenkins et al. | |
| 6,701,459 B2 | 3/2004 | Ramanathan et al. | |
| 7,024,459 B2 | 4/2006 | McNamara et al. | |
| 7,155,477 B2 | 12/2006 | Blair et al. | |
| 7,155,729 B1 * | 12/2006 | Andrew et al. | 719/318 |
| 7,259,666 B1 | 8/2007 | Hermsmeyer et al. | |
| 7,324,990 B2 | 1/2008 | Jaschek et al. | |
| 7,363,024 B2 | 4/2008 | Jenkins | |
| 7,509,304 B1 | 3/2009 | Pather et al. | |
| 7,630,986 B1 | 12/2009 | Herz et al. | |
| 7,636,424 B1 | 12/2009 | Halikhedkar et al. | |
| 2003/0046421 A1 | 3/2003 | Horvitz et al. | |

(Continued)

OTHER PUBLICATIONS

U.S. Appl. No. 12/250,912, Office Action mailed Feb. 16, 2011, 22 Pages.

(Continued)

*Primary Examiner* — Umut Onat
(74) *Attorney, Agent, or Firm* — Kilpatrick Townsend & Stockton LLP

(57) ABSTRACT

Methods and systems for collecting and distributing a plurality of notifications are disclosed. In one embodiment, the method includes receiving a plurality of notifications for a client from a plurality of publishers, wherein each notification of the plurality of notifications comprises a client identifier and a notification type identifier. The method also includes, for each notification of the plurality of notifications, authenticating the publisher of the notification upon receiving the notification. The method further includes, for each notification of the plurality of notifications, determining whether the client is subscribed to receive the type of notification identified by the notification type identifier from the publisher of the notification. The method also includes, for each notification of the plurality of notifications, outputting the notification to the client when the publisher of the notification is authentic and the client is subscribed to receive the type of notification from the publisher.

20 Claims, 18 Drawing Sheets

(56) References Cited

U.S. PATENT DOCUMENTS

| | | | |
|---|---|---|---|
| 2003/0055768 A1* | 3/2003 | Anaya et al. | 705/36 |
| 2004/0098399 A1 | 5/2004 | Risberg et al. | |
| 2004/0128355 A1 | 7/2004 | Chao | |
| 2004/0224771 A1* | 11/2004 | Chen et al. | 463/42 |
| 2005/0140519 A1 | 6/2005 | Smith | |
| 2005/0219061 A1* | 10/2005 | Lai et al. | 340/825 |
| 2005/0273810 A1 | 12/2005 | Zimmerman et al. | |
| 2006/0026067 A1* | 2/2006 | Nicholas et al. | 705/14 |
| 2006/0068761 A1* | 3/2006 | Chambers et al. | 455/412.1 |
| 2006/0173743 A1* | 8/2006 | Bollay | 705/14 |
| 2006/0195533 A1 | 8/2006 | Isozaki et al. | |
| 2007/0005418 A1* | 1/2007 | Nishar et al. | 705/14 |
| 2007/0011314 A1 | 1/2007 | Horvitz et al. | |
| 2007/0124228 A1 | 5/2007 | Elias et al. | |
| 2007/0130004 A1* | 6/2007 | Borgs et al. | 705/14 |
| 2007/0156656 A1* | 7/2007 | Pather et al. | 707/3 |
| 2007/0198695 A1 | 8/2007 | Engelmann et al. | |
| 2007/0214228 A1 | 9/2007 | Horvitz et al. | |
| 2007/0288932 A1 | 12/2007 | Horvitz et al. | |
| 2008/0162183 A1 | 7/2008 | Sachanandani et al. | |
| 2008/0222545 A1 | 9/2008 | Lemay | |
| 2008/0307066 A1* | 12/2008 | Amidon et al. | 709/217 |
| 2009/0030936 A1 | 1/2009 | Ordille et al. | |
| 2009/0176517 A1 | 7/2009 | Christie et al. | |
| 2009/0177617 A1 | 7/2009 | Lee | |
| 2009/0222527 A1 | 9/2009 | Arconati et al. | |
| 2009/0307715 A1 | 12/2009 | Santamaria et al. | |

OTHER PUBLICATIONS

U.S. Appl. No. 12/416,341, Response to Office Action filed Feb. 15, 2011.

Non-Final Office Action in U.S. Appl. No. 12/250,912 mailed Sep. 2, 2010.

Response to Non-Final Office Action in U.S. Appl. No. 12/250,912, filed Dec. 2, 2010.

Non-Final Office Action in U.S. Appl. No. 12/416,341 mailed Nov. 15, 2010.

"Download Notifications," web page at http://www.microsoft.com/downloads/render.aspx?content=notification . . . , as available via the internet and printed on Apr. 20, 2008.

"Desktop Notifications (using libnotify) / ROX Desktop," web page at http://roscidus.com/desktop/node/336, as available on the internet and printed on Apr. 20, 2008.

"Google Alerts," web page at http:www.google.com/support/alerts/bin/static.py?page=faq.html&hl=en, as available on the internet and printed on Apr. 20, 2008.

"Growl—About," web page at http://growl.info/about.php, as available on the internet and printed on Apr. 20, 2008.

U.S. Appl. No. 12/250,912, filed Oct. 14, 2008 (Shapiro).

U.S. Appl. No. 12/416,341, filed Apr. 1, 2009 (Beckert et al.).

U.S. Appl. No. 12/416,409, filed Apr. 1, 2009 (Beckert).

Xep-0060: Publish-Subscribe, available at http://xmpp.or/extensions/xep-0060.html (Last accessed Dec. 4, 2008).

Office Action mailed May 5, 2011 in U.S. Appl. No. 12/416,409, 17 pages.

Response to Office Action in U.S. Appl. No. 12/416,409, filed Aug. 5, 2011.

Office Action mailed May 19, 2011 in U.S. Appl. No. 12/416,341, 25 pages.

Office Action mailed May 25, 2011 in U.S. Appl. No. 12/250,912, 22 pages.

Non Final Office Action in Related U.S. Appl. No. 12/416,409, dated Dec. 21, 2012, 19 pages.

Non Final Office Action in Related U.S. Appl. No. 12/250,912, dated Jan. 18, 2013, 27 pages.

Non Final Office Action in Related U.S. Appl. No. 12/416,341, dated Feb. 20, 2013, 30 pages.

* cited by examiner

Figure 15

SYSTEMS AND METHODS FOR COLLECTING AND DISTRIBUTING A PLURALITY OF NOTIFICATIONS

FIELD OF THE INVENTION

Embodiments of the disclosure relate generally to the field of data processing systems. For example, embodiments of the disclosure relate to systems and methods for collecting and distributing a plurality of notifications.

BACKGROUND

Many applications create notifications for a client user in order to notify the user of an activity that may be of interest to the user. For example, some instant messaging (IM) programs running in the background of an operating environment output a notification to the user when a contact becomes available. Some email applications notify the client when a new email is received for the user. Some update programs output a notification to the client when updates to a program on the client are downloaded and are to be installed.

One group of notifications that exist are notifications from publishers/third party sources that are transmitted to the client by the publisher. A conventional notification delivery system from publishers to clients comprises a publisher directly connected to a plurality of clients via the internet. For example, a webmail publisher that is accessed through a website by a user with an account may output a notification to the client when new webmail for the client is received. In another example, an airline retail publisher may output a notification to the client when a sale occurs on a specific flight. Additionally, many retail and social networking publishers output advertisements and updates that may be of interest to a user via email to the client. Another group of notifications are notifications generated by the client for the user, such as temperature warnings and security updates.

Typically, a dedicated application for each publisher must be operating on the user's client in order for the user to receive each of the notifications being sent by the publishers. For example, a notifier must be operating on the client to receive a notification from one webmail publisher when webmail is received. Another notifier must be operating on the client to receive airfare notifications. Another notifier must be operating to receive an advertisement from an online bookstore. In addition, a local operation notifier must be running on the client in order to receive a notification generated by the client, such as a reminder to install critical operating system updates.

One problem is that multiple components or applications running at the same time on the client vie for the client's processing and memory resources, thus affecting the client's performance. Another problem is that an operating system's Graphical User Interface (GUI) may become cluttered with multiple notifier icons outputting user notifications. Another problem is that many publishers require direct contact with the client in order to deliver a notification, reducing bandwidth available to the user.

SUMMARY

Methods and systems for collecting and distributing a plurality of notifications are disclosed. In one embodiment, the method includes receiving a plurality of notifications for a client from a plurality of publishers, wherein each notification of the plurality of notifications comprises a client identifier and a notification type identifier. The method further includes, for each notification of the plurality of notifications, authenticating the notification upon receiving the notification. The method also includes, for each notification of the plurality of notifications, authenticating the publisher of the notification upon receiving the notification. The method further includes, for each notification of the plurality of notifications, determining whether the client is subscribed to receive the type of notification identified by the notification type identifier from the publisher of the notification. The method also includes, for each notification of the plurality of notifications, outputting the notification to the client when the publisher of the notification is authentic and the client is subscribed to receive the type of notification from the publisher.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 15 illustrates an example parameter dialog with a user in order for a user to change parameters of the notifier.

DETAILED DESCRIPTION OF EMBODIMENTS

Figure 1:
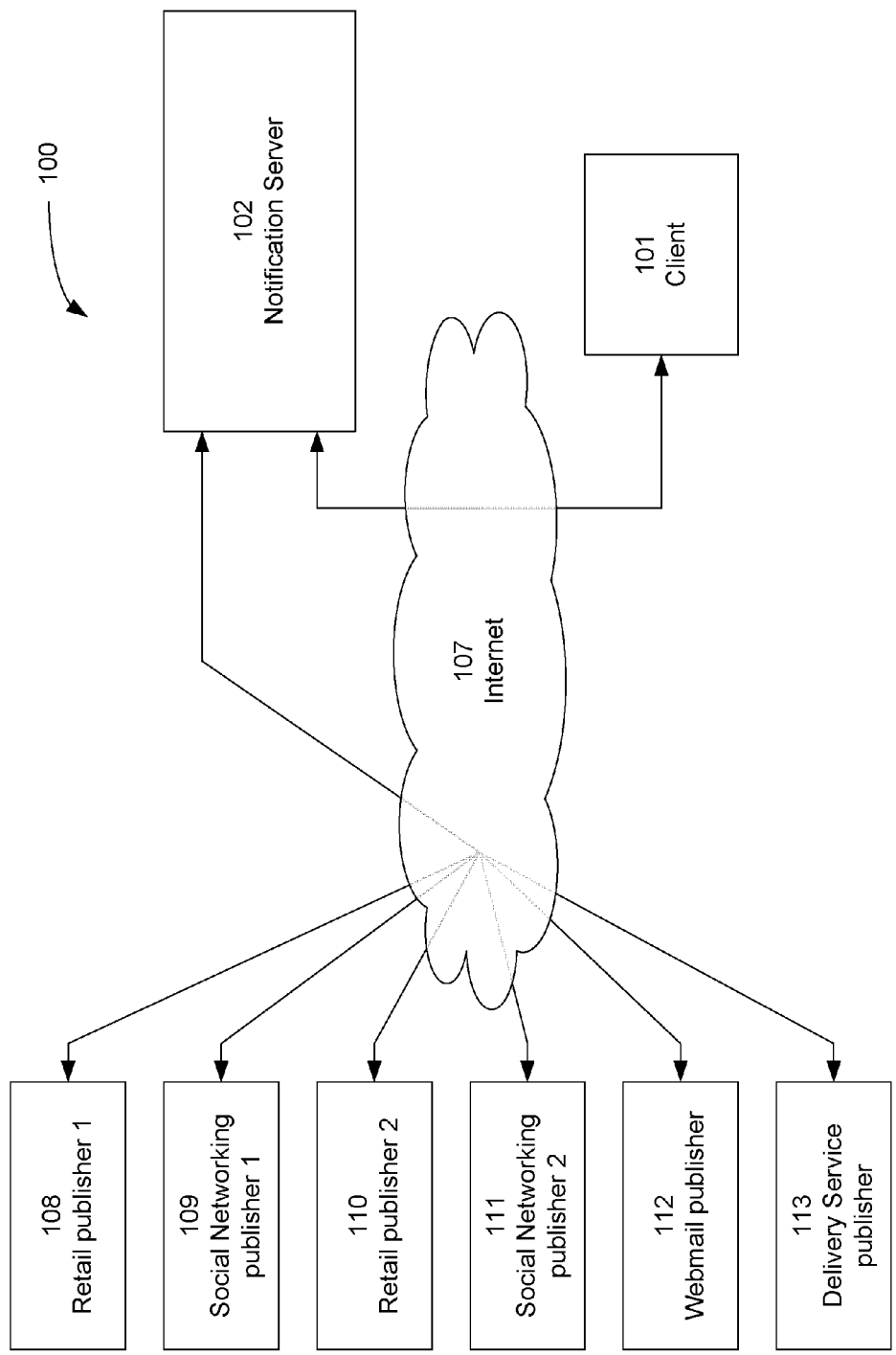
FIG. 1 shows an illustrative system for outputting notifications to a client.

Embodiments of the disclosure relate generally to the field of data processing systems. For example, embodiments of the disclosure relate to systems and methods for collecting and distributing a plurality of notifications. Throughout the description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Publishers are anyone producing content viewable via the internet, including retail stores, social networking sites, webmail sites, and package delivery services. Publishers send a myriad of notifications to user via the user's client to the internet. A third party server may collect all of the notifications intended for a client of the user and forward that information to the client. As a result, the client may include one connection to the notification server instead of a connection for each publisher.

The notification server may collect notifications for a plurality of clients. As a result, the notification server may determine, for each notification, the client to receive the notification. In addition, the notification server may determine if the publisher is valid to prevent, for example, phishing scams and delivery of malware. The server may also determine if the user wishes to receive the notification by determining, for example, if the user is signed up or subscribed to receive notifications from the specific publisher.

In outputting a notification to a client, a server may modify the notification by, for example, repackaging the notification to be uniform in format with other notifications. For example, an email notification may be converted to an XML script that pops up a window on the user's client. For the client to notify the user of a new notification, the client may run a notification application on a runtime environment on the operating system of the client.

In addition to outputting notifications to clients, the notification server may collect user information from the clients in response to users receiving notifications at the client. Possible information the user may receive includes whether the user clicks on the notification or the amount of time a mouse pointer is positioned over a notification. The collected information may be used to determine the success of a notification.

User Notifications

A notification is a note to a user in order to notify him or her of an action or event. In one embodiment, the notification may be from a publisher or generated by the user's client. Notifications generated by a client may be notifications of hardware or software events occurring on the client. For example, notifications from the client may notify the user of the processor overheating or updates to client software. For notifications from publishers, different types or groups of notifications exist: behavioral notifications, promotional notifications, and transactional notifications.

In one embodiment, behavioral notifications are notifications from social website publishers, such as social networking sites and webmail. Promotional notifications may be notifications from retailers, manufacturers, etc. promoting or advertising a product or service. For example, a new shoe may be promoted by a shoe store to recent customers who have signed up for updates. Transactional notifications may be notifications from stores or services that provide a transaction for the user. For example, a transactional notification may be sent from a pizza restaurant to the user when a pizza is being delivered to the user.

Transactional notifications may be grouped as discrete notifications or parameter notifications. In one embodiment, discrete notifications are to notify the user of a discrete transaction. For example, a discrete notification may be a purchase confirmation from a store in response to an online purchase by the user. Parameter notifications may notify the user when user defined parameters are met in a specific situation. For example, a user may set a parameter for flights from Los Angeles to New York to be less than $400. Hence, if a seat becomes available for less than $400, a notification is sent to the user in order to notify him or her that an airline seat meets the predefined parameters.

Illustrative Embodiment of System for Collecting and Transferring Notifications FIG. 1 shows an exemplary system 100 for outputting the various types of notifications from publishers 108-113 to a client 101 via a notification server 102. In one embodiment, the publishers 108-113 are couplable via the internet 107 to the notification server 102. The notification server 102 is also couplable to the client 101 via the internet 107. Notifications may be sent from the publishers 108-113 to the notification server 102. The notification server 102 may collect the notifications and then output them to the client 101. As a result, to receive notifications, the client 101 may connect to just the notification server 102 instead of being required to connect to each publisher to receive a notification.

Illustrative Embodiment of Notification Server

Figure 2:
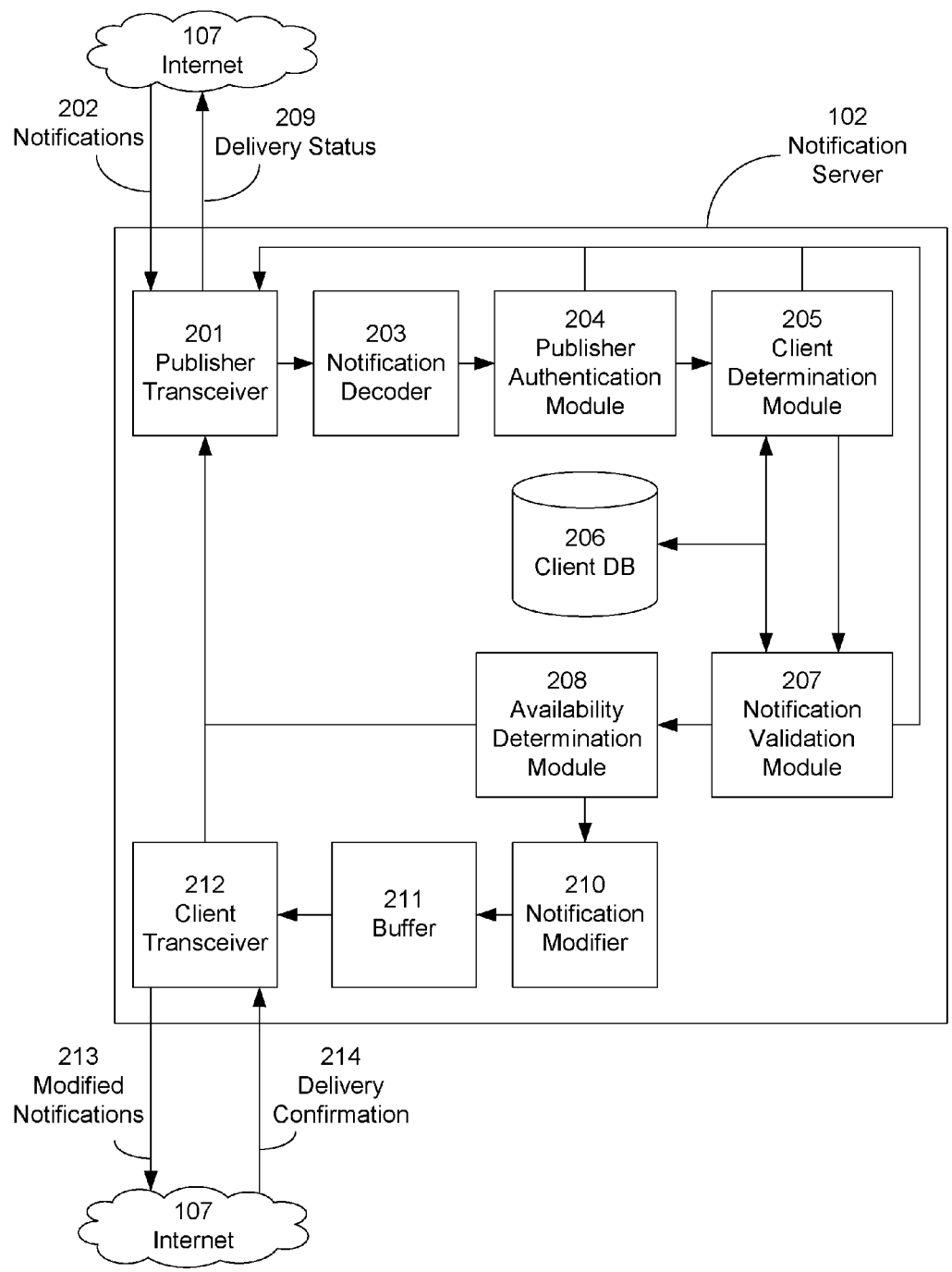
FIG. 2 shows an exemplary notification server of the system illustrated in FIG. 3.

FIG. 2 shows an exemplary notification server 102 of the system 100 in FIG. 2. The notification server 102 may include a publisher transceiver 201 to receive notifications 202 from the publishers. In one embodiment, the transceiver 201 may receive notifications 202 in multiple formats. Formats may include, but are not limited to, Java® scripts, extensible markup language (XML) scripts, object-oriented language scripts, text scripts, email, and hypertext markup language (HTML) scripts.

The notification server 102 may further include a notification decoder 203 to decode a received notification 202. The decoder 203 may be configured to extract a publisher identifier and a client identifier from the notification 202. The decoder 203 may be further configured to extract a certificate generated by the publisher from the notification 202. The certificate may be used to verify the authenticity of the publisher, as later described.

The notification server may also include a publisher authentication module 204 to authenticate the publisher outputting the notification 202. In one embodiment, the authentication module 204 may determine whether the certificate of the notification is a valid certificate. For example, information about the publisher received by the notification server 102 with the notification 202 may be embedded in the certificate (e.g., port number, IP address, publisher name, time sent, etc.). Hence, the publisher authentication module 204 may be configured to compare the properties in the certificate to the received properties with the notification 202. In another embodiment, a password or a unique identifier is included in the certificate which may be compared by the publisher authentication module 204 to a stored password or identifier.

In one embodiment, the notification server 102 includes a publisher database (not shown) in order for the publisher authentication module 204 to retrieve stored information about a publisher to compare with the information received in the notification. The publisher database may be updated by the publishers when updates are made to the publisher or notifications being sent by the publisher. In another embodiment, the notification server 102 may update the publisher database when new information is received within a notification.

The notification server 102 may also include a client determination module 205 to determine the client intended to receive the notification 202. In one embodiment, the client determination module 205 is configured to use the client identifier from the notification 202 to lookup up the client in a client database 206. The client database 206 may include information on how to contact the client (e.g., IP address) which may be used to output the notification 202. In another embodiment, the client determination module 204 may be configured to receive contact information for the client from the notification 202. For example, the notification 202 may include an IP address for the client where the notification 202 is to be outputted.

In addition, the notification server 102 may include a notification validation module 207 to determine whether the notification 202 should be sent to the identified client. In one embodiment, the notification validation module 207 is configured to check the client database 206 for user preferences on notifications. For example, the client database 206 may include for each client information about which notifications should be outputted. For example, a list of approved publishers to send notifications may exist. In another embodiment, a maximum number of notifications total, per publisher, or per notification type may be set and determined whether the new notification 202 exceeds the limit of notifications to be sent to the client.

In one embodiment, the notification server 102 includes a client availability determination module 208. A client may sometimes be unavailable (e.g., unable to connect to the internet 107) and therefore unable to receive a notification 202 from the notification server 102. Hence, the notification server 102 may be configured to attempt to contact the client to determine if the client is available. For example, the client may be pinged by the notification server 102, and the notification server 102 waits to receive a response to the ping. Alternatively, the client availability determination module 208 may check a client database (e.g., client database 206) that includes a list of available clients to receive a notification.

In one embodiment, a user of a client actively subscribes to receive specific types of notifications from specific publishers. For example, a user may select to receive promotional notifications from a retail store publisher. Therefore, the identifier validation module 607 determines that the client is subscribed to receive promotional notifications from the retail store publisher when checking notifiers intended for that client.

The client availability determination module 208 may further be configured to output a failed delivery status 209 via the publisher transceiver 201 to the publisher. Therefore, the publisher may know that the client is unavailable to currently receive a notification. In one embodiment, the notification server 102 may be configured to store the notification until the client is available. In another embodiment, the publisher resends at a later time the notification 202 to the notification server 102.

The notification server 102 may further include a notification modifier 210 to modify the notification 202 into a format receivable by the client. In one embodiment, all notifications 202 are modified to be into XML script of a predetermined format to be executed by the notifier running on the client. In another embodiment, the publisher may send a notification 202 already in the format to be received by the client.

Furthermore, the notification server 102 may include a buffer 211 to temporarily store a modified notification 211 before it is outputted to the client. In one embodiment, the buffer 211 is configured to store notifications when the client is unavailable to receive the notification. The buffer 211 may be further configured to pass through notifications destined for an available client to client transceiver 212 to transmit the modified notification 213 to the client via the internet 107. The buffer 211 may further queue notifications for output when the client transceiver 212 is busy in order to prioritize the notifications to be sent to clients.

In an alternative embodiment to individually outputting each notification to a client, the notification server 102 may be configured to bundle multiple notifications into a summary that is sent to the client. For example, the buffer 211 may store multiple notifications intended for the same client, and the client transceiver may package the multiple notifications into one XML script sent to the client.

Figure 3:
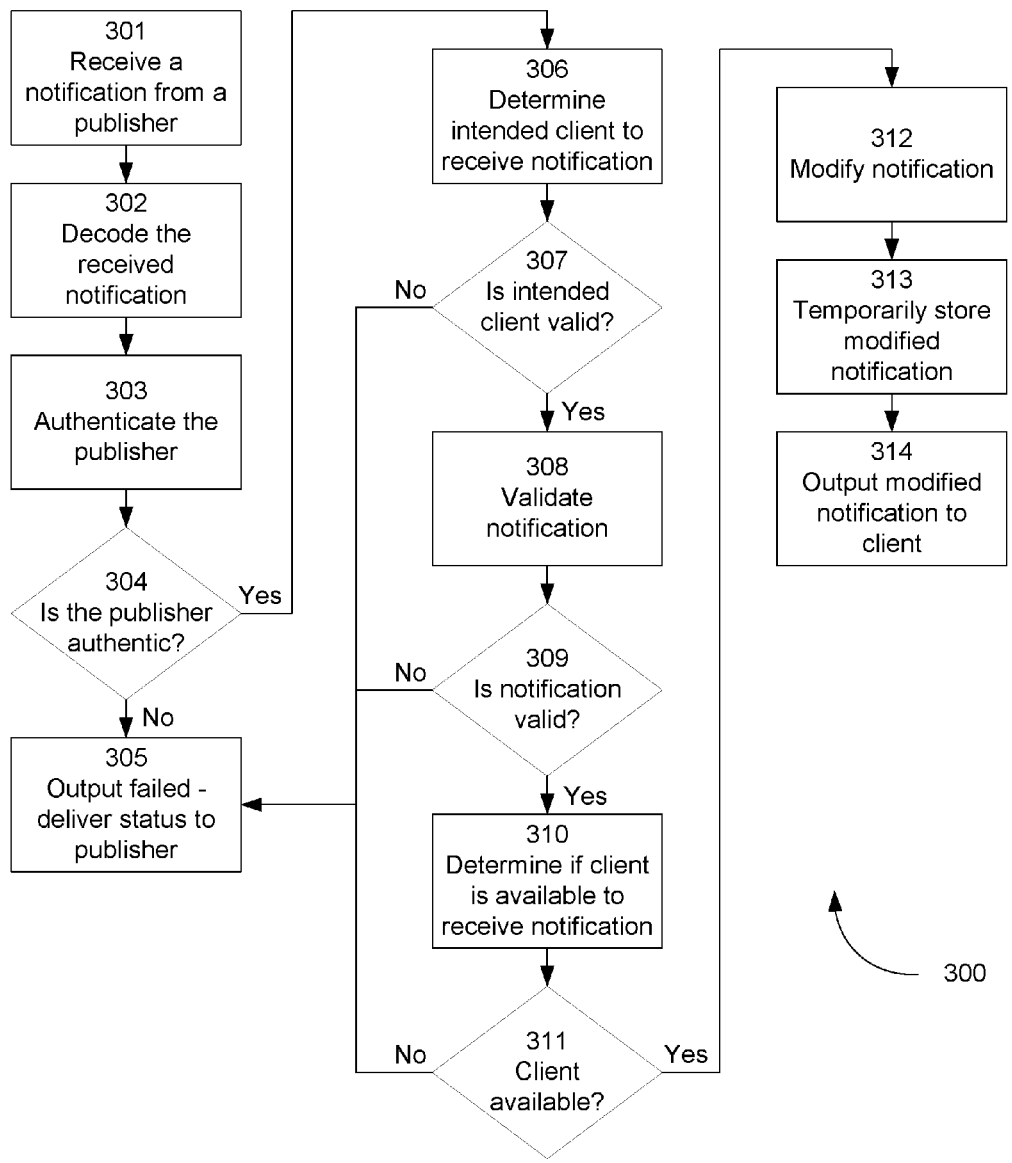
FIG. 3 illustrates an exemplary method for collecting and outputting notifications by the notification server of FIG. 2.

FIG. 3 illustrates an exemplary method 300 for collecting and outputting a notification 202 by the notification server 102 of FIG. 2. In one embodiment, method 300 may be repeated for each received notification of a plurality of notifications that may be received by the notification server 102. Beginning at 301, the notification server 102 receives a notification 202 from a publisher at the publisher transceiver 201. The notification may be of any type (e.g., promotional, transactional, or behavioral). The notification decoder 203 of the notification server 102 may then decode the received notification 202 in 302.

Proceeding to 303, the publisher authentication module 204 of the notification server 102 may authenticate the publisher. In one embodiment, the publisher authentication module 204 determines the validity of a certificate authored by the publisher in the notification. In another embodiment, the notification server 102 may ping the server for information to compare with the notification in determining whether the publisher is a valid publisher. As a result, the notification server may attempt to prevent malware or spyware groups from outputting fake notifications to a client through impersonation of a valid publisher.

In 304, the publisher authentication module 204 determines if the publisher is authenticated. If the publisher is not authenticated, then the notification server 102 outputs a failed delivery status 209 to the publisher via the publisher transceiver 201 in 305. Example instances of when the publisher is not authenticated include when the certificate does not match information available to the server 102 or when the publisher cannot be pinged by the notification server 102 in response to receiving a notification.

If the publisher is authentic in 304, then the client determination module 205 determines the intended client to receive the notification 202 in 306. In one embodiment, the notification 202 may contain a client identifier. The client identifier can specifically identify the client or can identify a class of client from which the client determination module can use to determine the specific clients. Upon determining the client, the client determination module 205 may determine if the intended client is valid in 307. For example, the notification 202 may identify a client that may no longer exist. In another example, the client may be incompletely identified by the notification 202 such that a specific client cannot be identified. If the client is not valid in 307, then the notification server 102 may output a failed delivery status 209 to the publisher via the publisher transceiver 201 in 305.

If the client is valid in 307, then the notification validation module 207 validates the notification 202 in 308. Validation of the notification may depend on client or user preferences. For example, a user may refuse to receive promotional notifications or more than two notifications from one source in an hour. In one embodiment, the notification validation module 207 determines if the client is subscribed to receive the type of notification (e.g., behavioral, promotional, etc.) of notification 202 from the publisher. If the notification server 102 determines that the notification 202 is not valid in 309 (e.g., the notification validation module 207 determines that the client is not subscribed to receive the type notification of notification 202 from the publisher), then the notification server 102 outputs a failed delivery status 209 to the publisher in 305.

If the notification is valid in 309, then the client availability determination module 208 determines if a client is available to receive notification 202 in 310. If the server 102 receives a response that the client is not available in 311, then the notification server 102 outputs a failed delivery status 209 to the publisher in 305. Examples of when a client may be unavailable include when the client is not connected to the internet or not connectable to the notification server 102, when a client is set to do not disturb by a user so as not to be contacted by the notification server 102, or the client's receiver is busy such that the client is unable to receive the notification.

If the client is available to receive the notification 202 in 311, then the notification modifier 210 in 312 modifies the notification 202 into a format accessible by the client. For example, all notifications may be converted to XML script for the client. Since all notifications may be sent in a common format, the client may run one notifier to receive all notifications from the notification server 102. The notifier may further call other programs to receive any information to be included with the notification. For example, the notifier may call an internet browser on the client to open a URL.

Upon the notification server 102 modifying the notification 202, the buffer 211 of the notification server 102 may temporarily store the modified notification in 313 before transmitting the notification to the intended client. Once the client and the client transceiver 212 are available, the notification server 102 may output the modified notification 213 to the client in 314.

Referring back to FIG. 2, the notification server 102 may be configured to receive a delivery confirmation 214 from the client upon outputting a modified notification 213 to the client. Hence, the notification server 102 may be configured to output a successful delivery status 209 to the publisher upon receiving a delivery confirmation 214 from the client. The notification server 102 may also be configured to output a failed delivery status 209 to the publisher if a response is not received from the client in a predetermined amount of time.

Figure 4:
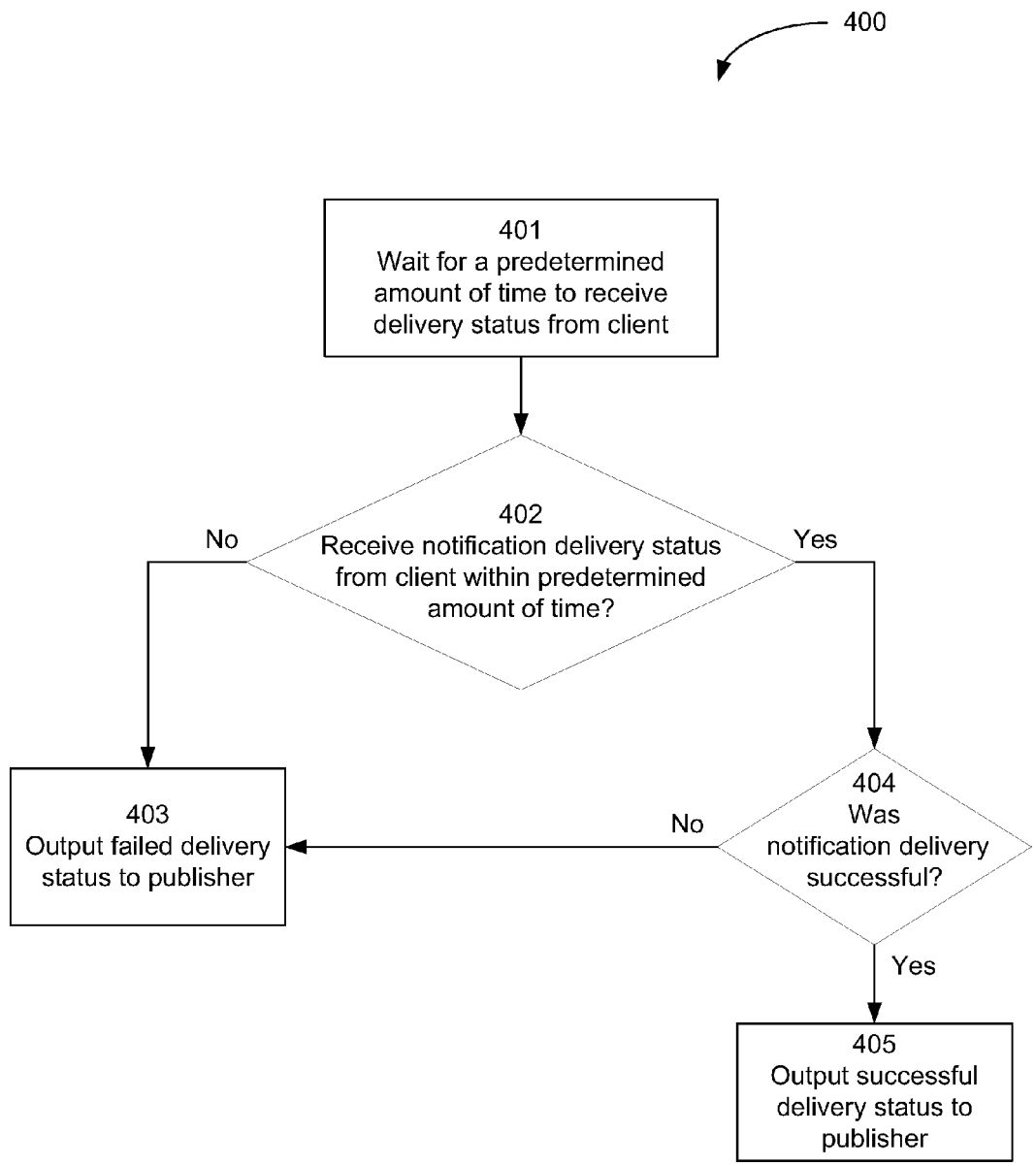
FIG. 4 illustrates an exemplary method for receiving and outputting delivery status of the notification by the notification server of FIG. 2.

FIG. 4 illustrates an exemplary method 400 for receiving and outputting delivery status of the modified notification 213 by the notification server 102 of FIG. 2. In one embodiment, method 300 may be repeated for each received notification of a plurality of notifications that may be received by the notification server 102. Beginning at 401, the notification server 102 waits for a predetermined amount of time to receive a delivery status from the client. In one embodiment, the client transceiver 212 (FIG. 2) may include circuitry to count the predetermined amount of time. Proceeding to 402, the notification server 102 determines whether a notification delivery status is received from the client in the predetermined amount of time. If a notification delivery status is not received in time, the notification server 102 outputs a delivery status 209 to the publisher that the notification was failed to be delivered in 403.

If a notification delivery status is received, then the notification server 102 determines if the notification delivery to the client was successful in 404. For example, the client may have received incomplete information from the notification server 102. Therefore, the client may output a notice to the notification server 102 that delivery of any notification failed. If the notification delivery was not successful, then the notification server 102 outputs a failed delivery status 209 to the publisher in 403. If the client successfully receives the notification, then the client may output a successful delivery confirmation 214 to the notification server 102. If the notification delivery was successful, then the notification server 102 may output a successful delivery status 209 to the publisher in 405.

In one embodiment, the notification received from the client may be forwarded to the publisher. In another embodiment, the notification server 102 may modify the response from the client or create a new response to be sent to the publisher in a format understandable by the publisher. For example, the notification server 102 may receive an XML script from the client and create a Java® script to be sent to the publisher.

The exemplary system and notification server described above pass a notification from the publisher to the notification server to be delivered to the client. In an alternate embodiment, an identifier of the notification is sent from the publisher to the client via the notification server to notify the client that a notification for the client is present at the publisher. The client may then connect to the publisher in order to receive the notification.

Alternative Embodiment of System for Collecting and Transferring Notifications

Figure 5:
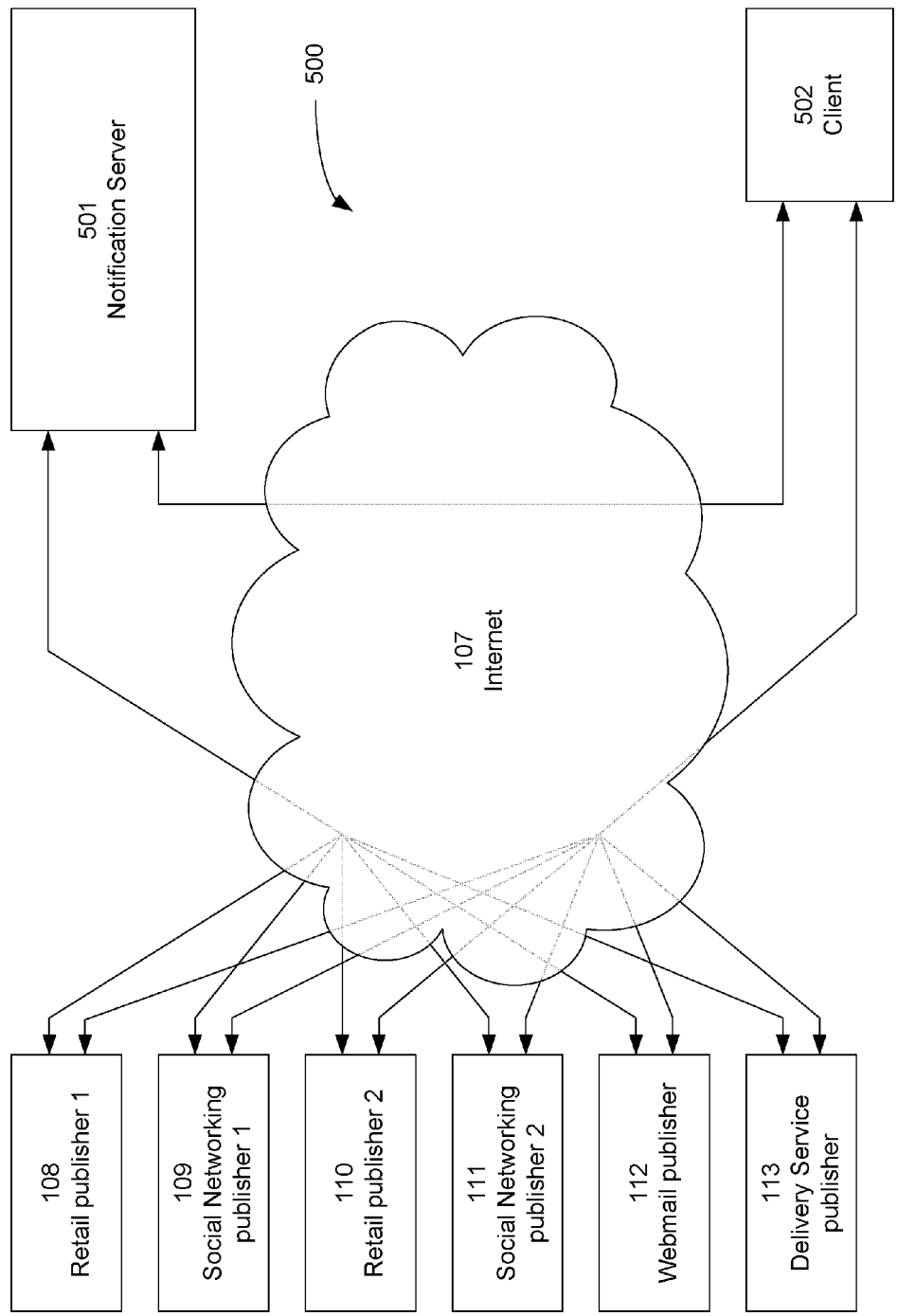
FIG. 5 shows another example system for outputting notifications to a client.

FIG. 5 shows another example system 500 for outputting a notification from publishers 108-113 to a client 502. In one embodiment, method 500 may be repeated for each notification of a plurality of notifications to be outputted to the client by the notification server 102. The notification server 501 couplable to the client 502 and the publishers 108-113 via the internet 107 may pass a notification identifier instead of the notification. As a result, the client 502 is couplable to the publishers 108-113 via the internet in order to receive the notification.

Illustrative Embodiment of Notification Server

Figure 6:
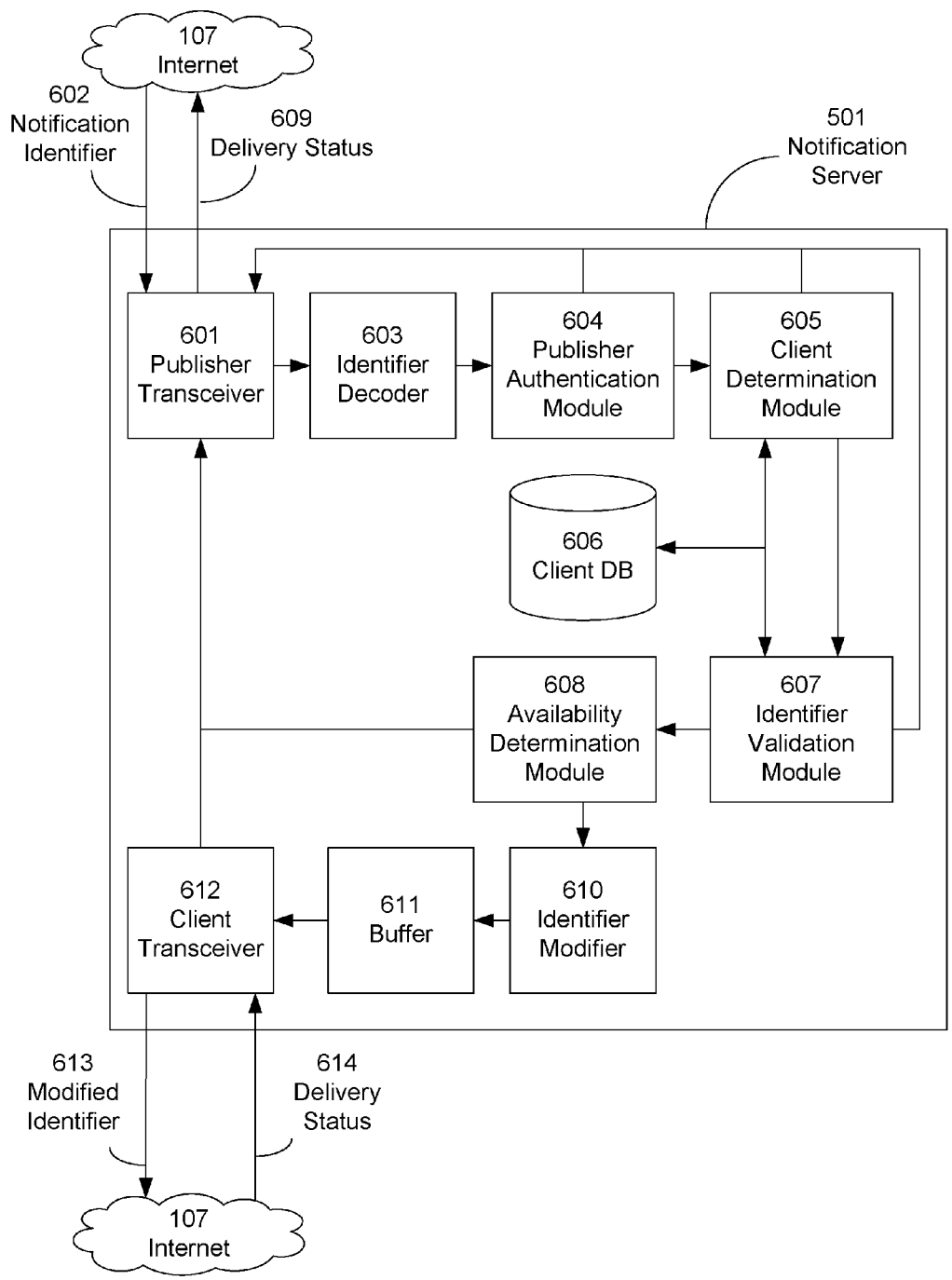
FIG. 6 shows an exemplary notification server of the system illustrated in FIG. 5.

FIG. 6 shows an exemplary notification server 501 of the system illustrated in FIG. 5. The notification server 501 may perform similar operations using notification identifiers as the notification server 102 shown in FIG. 2 using notifications. The notification server 501 may include a publisher transceiver 601 to receive notification identifiers 602 from the publishers. In one embodiment, the transceiver 601 may receive notification identifiers 602 in multiple formats. Formats may include, but are not limited to, Java® scripts, extensible markup language (XML) scripts, object-oriented language scripts, text scripts, email, and hypertext markup language (HTML) scripts.

The notification server 501 may further include a notification identifier decoder 603 to decode a received notification identifier 602. The decoder 603 may be configured to extract a publisher identifier (source) and a client identifier (destination) from the notification identifier 602. The decoder 603 further may be configured to extract from the notification identifier 602 a certificate generated by the publisher. The certificate may be used to verify the authenticity of the publisher, as later described.

The notification server may also include a publisher authentication module 604 to authenticate the publisher outputting the notification identifier 602. In one embodiment, the authentication module 604 may determine whether the certificate of the notification identifier 602 is a valid certificate. For example, information about the publisher received by the notification server 501 with the notification identifier 602 may be embedded in the certificate (e.g., port number, IP address, publisher name, time sent, etc.). Hence, the publisher authentication module 604 may be configured to compare the properties in the certificate to the received properties with the notification identifier 602. In another embodiment, a password, hash key, or other unique identifier is included in the certificate which may be compared by the publisher authentication module 604 to a stored or generated password, hash key, or identifier.

The notification server 501 may also include a client determination module 605 to determine the client intended to receive the notification identifier 602. In one embodiment, the client determination module 605 is configured to use the client identifier from the notification identifier 602 to lookup up the client in a client database 606. The client database 606 may include information on how to contact the client (e.g., IP address) which may be used to output the notification identifier 602. In another embodiment, the client determination module 604 may be configured to receive contact information for the client from the notification identifier 602. For example, the notification identifier 602 may include an IP address for the client where the notification identifier 602 is to be delivered.

In addition, the notification server 501 may include a identifier validation module 607 to determine whether the notification identifier 602 should be sent to the identified client. In one embodiment, the identifier validation module 607 is configured to check the client database 606 for user preferences on notifications the client is to download from the publisher. In one embodiment, the client database 606 may include for each client information about which notifications are of importance to the user of the client. For example, a list of approved publishers to send notifications may exist. In another embodiment, a maximum number of notifications total, per publisher, or per notification type may be set and used to determine whether the client has downloaded from the publisher the maximum number of notifications as prescribed.

In one embodiment, a user actively subscribes to receive specific types of notifications from specific publishers. For example, a user may select to receive promotional notifications from a retail store publisher. Therefore, the identifier validation module 607 determines that the client is subscribed to receive promotional notifications from the retail store publisher when checking notifier identifiers intended for that client.

In one embodiment, the notification server 501 includes a client availability determination module 608. A client may sometimes be unavailable (e.g., unable to connect to the internet 107) and therefore unable to receive a notification identifier from the notification server 501. Hence, the notification server 501 may be configured to attempt to contact the client to determine if the client is available. For example, the client may be pinged by the notification server 501, and the notification server 501 waits to receive a response to the ping. Alternatively, the client availability determination module 608 may check a client database (e.g., client database 606) that includes a list of available clients to receive a notification identifier.

The client availability determination module 608 may further be configured to output a failed delivery status 609 via the publisher transceiver 601 to the publisher. Therefore, the publisher may know that the client is unavailable to currently receive a notification identifier. In one embodiment, the notification server 501 may be configured to store the notification identifier until the client is available. In another embodiment, the publisher resends at a later time the notification identifier to the notification server 501.

The notification server 501 may further include a identifier modifier 610 to modify the notification identifier 602 into a format receivable by the client. In one embodiment, all notification identifiers 602 are modified to be into XML script of a predetermined format to be executed by the notifier running on the client. In another embodiment, the publisher may send a notification identifier 602 already in the format to be received by the client.

Furthermore, the notification server 501 may include a buffer 611 to temporarily store a modified notification identifier 613 before it is delivered to the client. In one embodiment, the buffer 611 is configured to store notification identifiers when the client is unavailable to receive the notification identifier. The buffer 611 further may be configured to pass through notification identifiers destined for an available client to client transceiver 612 to transmit the modified notification identifier 613 to the client via the internet 107. The buffer 611 may further queue notification identifiers for delivery when the client transceiver 612 is busy in order to prioritize the notification identifiers to be sent to clients.

In an alternative embodiment to individually outputting each notification identifier to a client, the notification server 501 may be configured to bundle multiple notification identifiers into a summary that is sent to the client. For example, the buffer 611 may store multiple notifications intended for the same client, and the client transceiver may package the multiple notifications into one XML script sent to the client.

Figure 7:
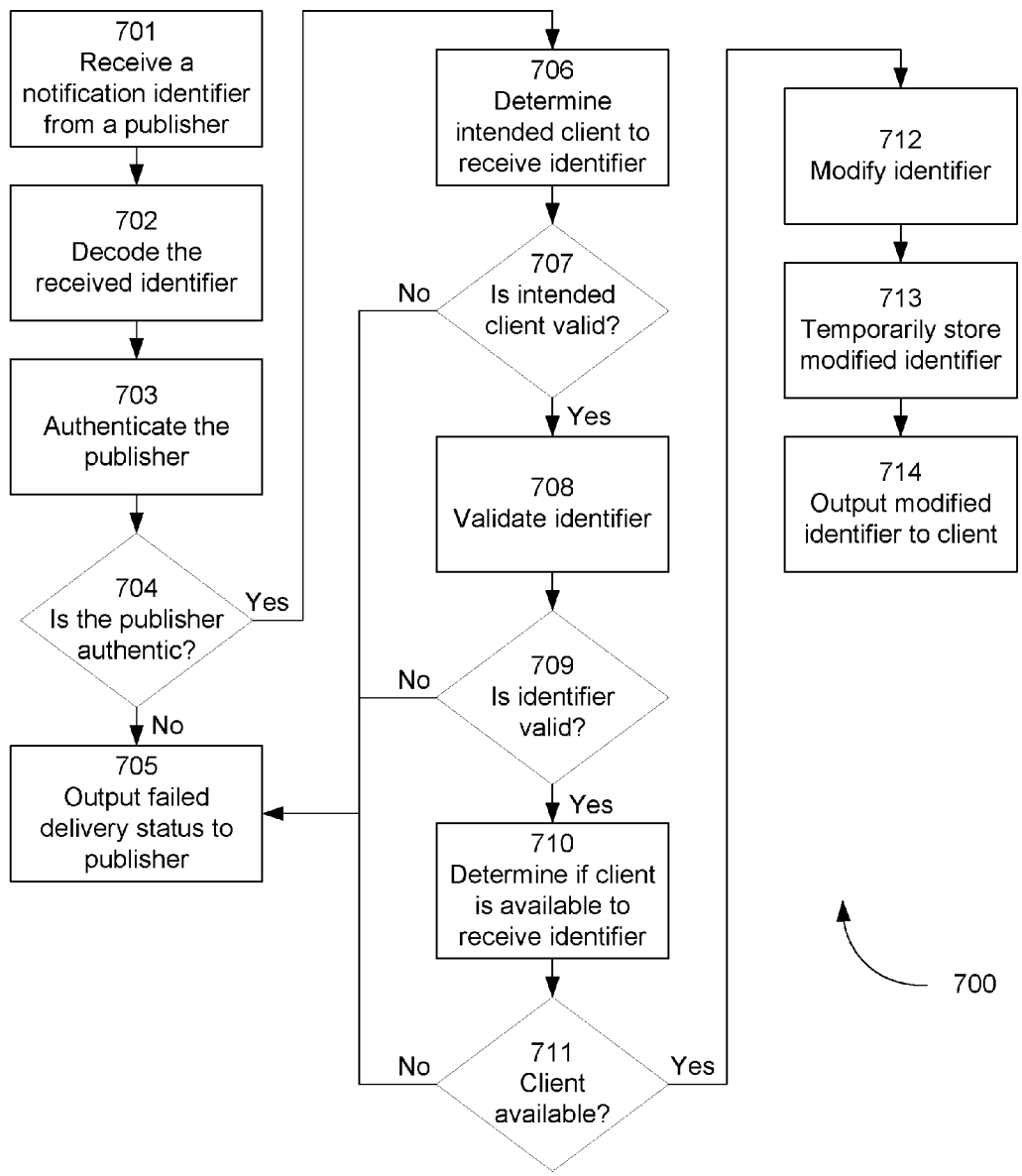
FIG. 7 illustrates an exemplary method for collecting and outputting notification identifiers by the notification server in FIG. 6.

FIG. 7 illustrates an exemplary method 700 for collecting and outputting a notification identifier 602 by the notification server 501 of FIG. 5. In one embodiment, method 700 may be repeated for each received notification identifier of a plurality of notification identifiers that may be received by the notification server 501. Beginning at 701, the notification server 501 receives a notification identifier 602 from a publisher at the publisher transceiver 601. The notification identifier may be for any type of notification (e.g., promotional, transactional, or behavioral). The identifier decoder 603 of the notification server 501 may then decode the received notification identifier 602 in 702.

Proceeding to 703, the publisher authentication module 604 of the notification server 501 may authenticate the publisher. In one embodiment, the publisher authentication module 604 determines the validity of a certificate authored by the publisher in the notification identifier. In another embodiment, the notification server 501 may ping the server for information to compare with the notification identifier in determining whether the publisher is a valid publisher. As a result, the notification server may attempt to prevent malware or spyware groups from outputting fake information to a client through impersonation of a valid publisher.

In 704, the publisher authentication module 604 determines if the publisher is authenticated. If the publisher is not authenticated, then the notification server 501 outputs a failed delivery status 609 to the publisher via the publisher transceiver 601 in 705. Example instances of when the publisher is not authenticated include when the certificate does not match information available to the server 501 or when the publisher cannot be pinged by the notification server 501 in response to receiving a notification identifier.

If the publisher is authentic in 704, then the client determination module 605 determines the intended client to receive the notification identifier 602 in 706. Upon determining the client, the client determination module 605 may determine if the intended client is valid in 707. For example, the notification identifier 602 may identify a client that may no longer exist. In another example, the client may be incompletely identified by the notification identifier 602 such that a specific client cannot be identified. If the client is not valid in 707, then the notification server 501 may output a failed delivery status 609 to the publisher via the publisher transceiver 601 in 705.

If the client is valid in 707, then the identifier validation module 607 validates the identifier 602 in 708. Validation of the identifier may depend on client or user preferences. For example, a user may refuse to receive identifiers for promotional notifications or more than two identifiers from one source in an hour. If the notification server 501 determines that the notification identifier 602 is not valid in 709, then the notification server 501 outputs a failed delivery status 609 to the publisher in 705.

If the notification is valid in 709, then the client availability determination module 608 determines if a client is available to receive notification identifier 602 in 710. If the server 501 receives notice that the client is not available in 311, then the notification server 501 outputs a failed delivery status 609 to the publisher in 705. Examples of when a client may be unavailable include when the client is not connected to the internet or not connectable to the notification server 501, when a client is set to do not disturb by a user so as not to be contacted by the notification server 501, or the client's receiver is busy such that the client is unable to receive the notification.

If the client is available to receive the notification identifier 602 in 711, then the identifier modifier 610 modifies the notification identifier 602 in 712 into a format accessible by the client. For example, all notification identifiers may be converted to XML script for the client. Since all notification identifiers may be sent in a common format, the client may run one notifier to receive all notification identifiers from the notification server 501. The notifier may further call other programs to receive any information from publishers in downloading the notification. For example, the notifier may call a download assistant for receiving notifications.

Upon the notification server 501 modifying the notification identifier 602 in 712, the buffer 611 of the notification server 501 may temporarily store the modified notification identifier in 713 before transmitting the notification identifier to the intended client. Once the client and the client transceiver 612 are available, the notification server 501 may output the modified notification identifier 613 to the client in 714.

Referring back to FIG. 6, the notification server 501 may be configured to receive a delivery confirmation 614 from the client upon outputting a modified notification identifier 613 to the client. Hence, the notification server 501 may be configured to output a successful delivery status 609 to the publisher upon receiving a delivery confirmation 614 from the client. The notification server 501 may also be configured to output a failed delivery status 609 to the publisher if a response is not received from the client in a predetermined amount of time.

Illustrative Embodiment of Client

Figure 8:
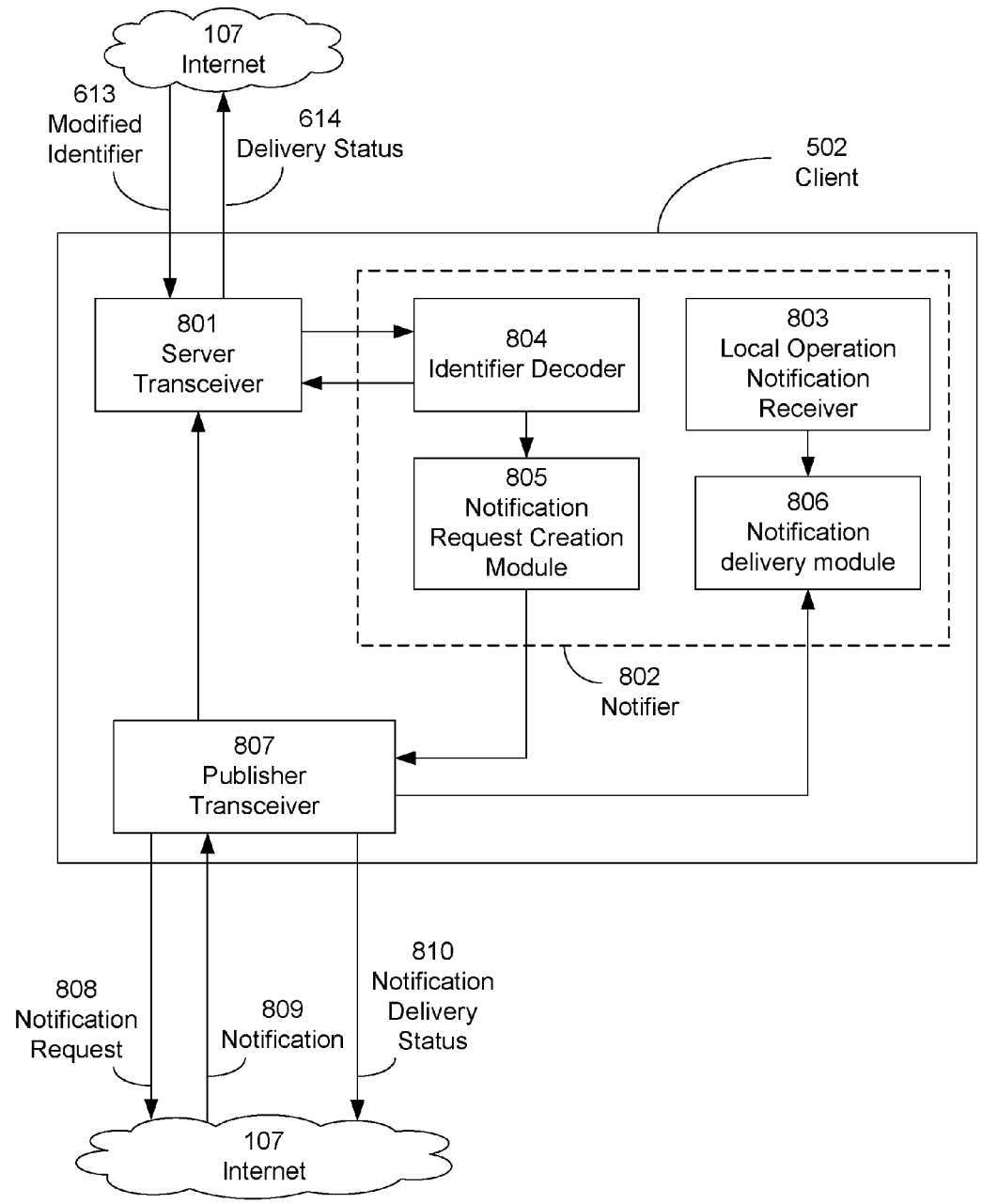
FIG. 8 shows an exemplary client of the system illustrated in FIG. 5.

FIG. 8 shows an exemplary client 502 of the system 500 illustrated in FIG. 5. In one embodiment, the client 502 is configured to receive the modified identifier 613 from the notification server 501 in FIG. 6 and further configured to connect to the publisher outputting the identifier in order to download the notification from the publisher. The client 502 may generally comprise a server transceiver 801 to connect to the notification server 501 in order to receive modified identifiers 613 and output delivery statuses 614.

The client 502 may further comprise a notifier 802, which may include: a local operation notification receiver 803 to receive notifications generated by components of the client 502 (e.g., hot core temperature); an identifier decoder 804 to decode the modified identifier 613; a notification request creation module 805 to create, format, and manage notification requests to be sent to the publisher; and a notification delivery module 806 to receive notifications from publishers and the client 502 and output the notifications to the client. In one embodiment, the notification delivery module 806 creates and delivers a graphical representation of the notification to a user of the client. The graphical representation may include, but is not limited to, plain text, a window, an image, an icon, markup language text, animation, or any combination.

The client 502 may also comprise a publisher transceiver 807 to connect with the publisher to send notification requests 808 packaged by the notification request creation module 805, receive notification 809 from the publisher, and output a notification delivery status 810 to the publisher via the internet 107. In one embodiment, the publisher transceiver 807 is connected to the server transceiver 801 to provide information for delivery status 614 to be sent to the notification server 501. For example, if a publisher is unreachable, the publisher transceiver 807 may time out waiting for a notification 809 from the publisher. Hence, the publisher transceiver 807 may output a failed notification delivery status 614 to the server transceiver 801 in order to be sent to the notification server 501.

Figure 9:
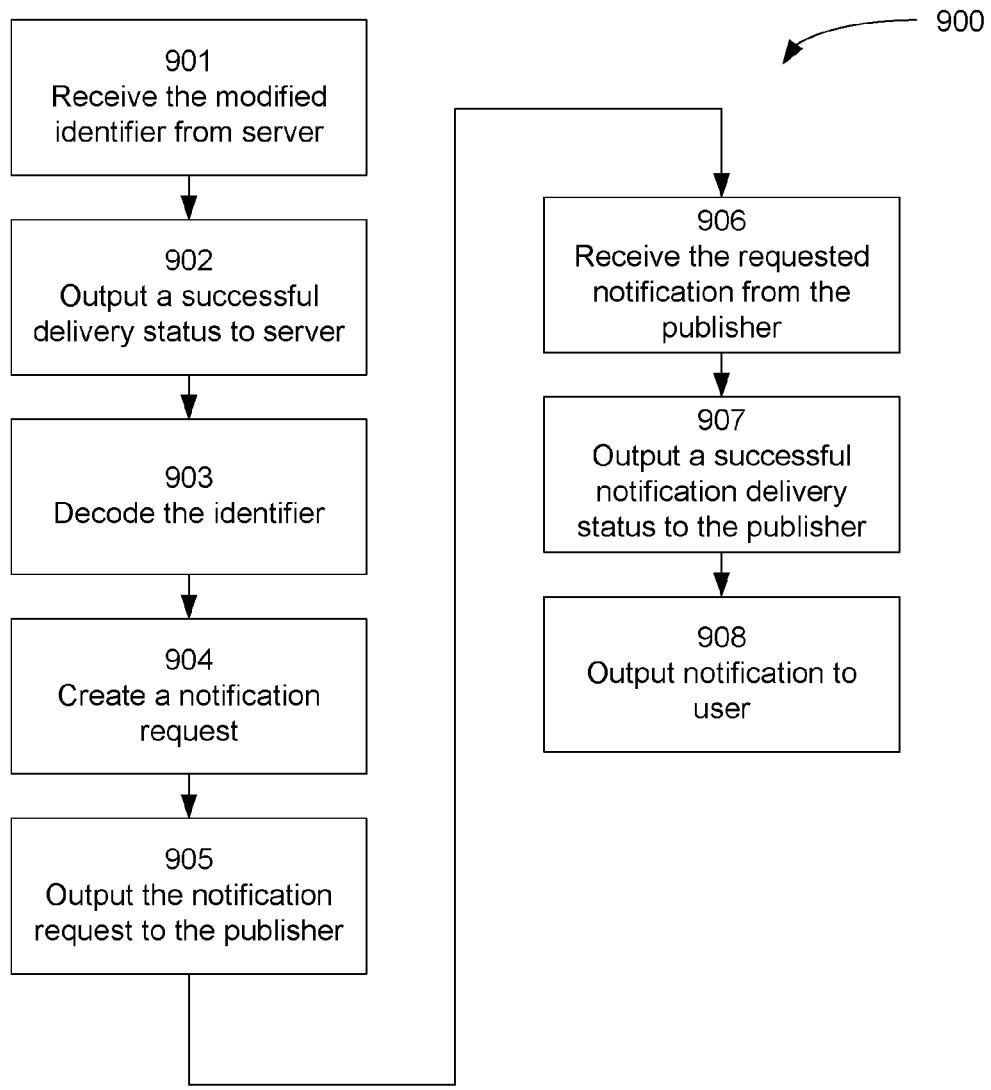
FIG. 9 illustrates an exemplary method for receiving notification identifiers and requesting notifications by the client illustrated in FIG. 8.

FIG. 9 illustrates an exemplary method 900 for receiving a notification identifier and requesting the notification by the client 502 illustrated in FIG. 8. In one embodiment, method 900 may be repeated for each received notification identifier of a plurality of notification identifiers that may be received by the client 502. Beginning at 901, the server transceiver 801 receives a modified identifier 613 from the notification server 501. Upon receiving the modified identifier 613 from the notification server 501, the server transceiver 801 outputs a delivery confirmation 614 indicating a successful delivery of the identifier to the client 502 in 902. In one embodiment, if the transmission of the identifier 613 is interrupted before the identifier 613 is received by the client 502, the transceiver 801 may output a failed delivery status to the notification server 501. The notification server 501 may then resend the identifier 613 or send a failed status to the publisher.

Proceeding to 903, the identifier 613 is passed to the notifier 802, and the identifier decoder 804 of the notifier 802 decodes the received identifier 613. For example, the decoder 804 may determine the publisher to be contacted and the connection settings of the publisher so that a connection between the client 502 and the publisher may be established. The decoder 804 may also determine the type of notification to be received. Thus, the client 502 may determine the importance of downloading the notification from the publisher and delay connecting to the publisher depending on the importance of the notification.

In one embodiment, if the identified publisher is a publisher the client 502 is not to connect to, the type of notification to be downloaded is unwanted by the client 502, or the connection settings of the publisher is incorrect such that connection is not possible, the identifier decoder 804 may output a failed delivery status 614 to the notification server 501 via the server transceiver 801. In another embodiment, the identifier decoder 804 may erase the identifier or a notification request is created and processed, with the publisher transceiver 807 outputting the failed delivery status 614 to the notification server 501 via the server transceiver 801.

Proceeding to 904, the notification request creation module 805 creates a notification request 808 to be sent to the publisher. The notification request creation module 805 may also collect the connection settings of the publisher in order to pass to the transceiver 807 to establish a connection with the publisher. For example, an IP address or network location may be forwarded to the publisher transceiver 807 so that the publisher transceiver 807 may send a ping to connect to the publisher. The notification request 808 may be in a specific format, such as HTML. Alternatively, the notification request 808 may be a call function for specific functions existing on a web service portal of the publisher. For example, the publisher may have a special portal for clients via the internet in order to download notifications and updates via direct connection.

Upon creating the notification request 808 in 904, the publisher transceiver 807 outputs the notification request to the publisher in 905. The transceiver 807 may then receive the requested notification 809 from the publisher in 906. In one embodiment, the publisher transceiver 807 stops waiting for the requested notification 809 from the publisher after a predetermined amount of time. The publisher transceiver 807 may then output a failed delivery status 614 to the notification server 501 via the server transceiver 801. The publisher transceiver 807 may include a timer in order to count the predetermined amount of time when waiting for a requested notification from a publisher. In another embodiment, the publisher transceiver 807 may output the request 808 if a notification 809 is not received.

Proceeding to 907, the publisher transceiver 807 outputs a successful notification delivery status 810 to the publisher. In one embodiment, if the notification 809 is corrupt, incomplete, or otherwise not transmitted successfully from the publisher, the publisher transceiver 807 may output a failed notification delivery status 810 to the publisher. The publisher may then resend the notification, or the client may attempt to repair a connection with the publisher.

Upon successfully receiving the notification 809 from the publisher, the notification delivery module 806 of the notifier 802 delivers the notification to the user in 908. In one embodiment, a graphical representation of the notification is presented to the user in order to notify the user of news from the publisher. For example, a pop-up window, plain text, markup language text, icons, animations, or other objects may be presented to the user in order to notify the user. The same presentation mechanism of the notification delivery module 806 may also be used for internal notifications generated by the client 502 and received by the local operation notification receiver 803.

Figure 10:
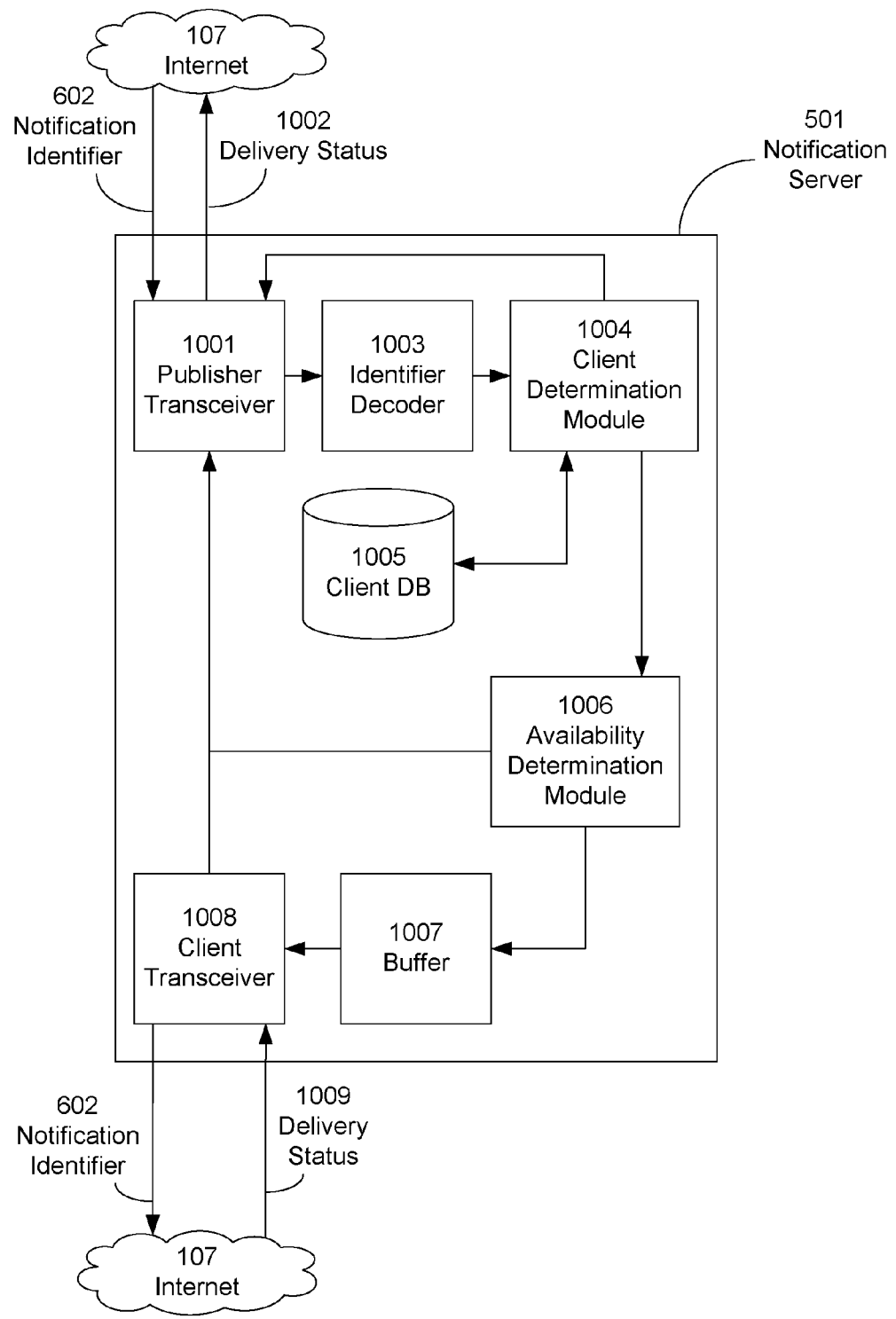
FIG. 10 shows another example notification server of the system illustrated in FIG. 5.
Figure 11:
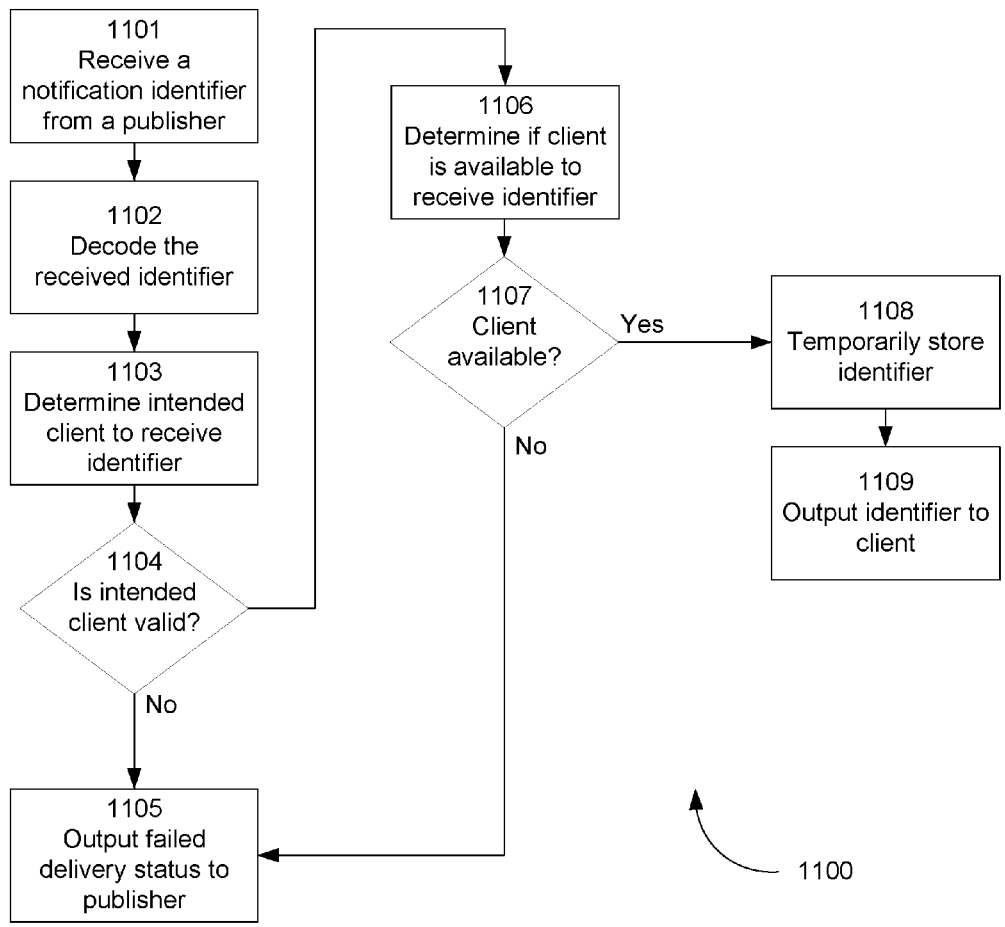
FIG. 11 illustrates an exemplary method for collecting and outputting notification identifiers by the notification server in FIG. 10.
Figure 12:
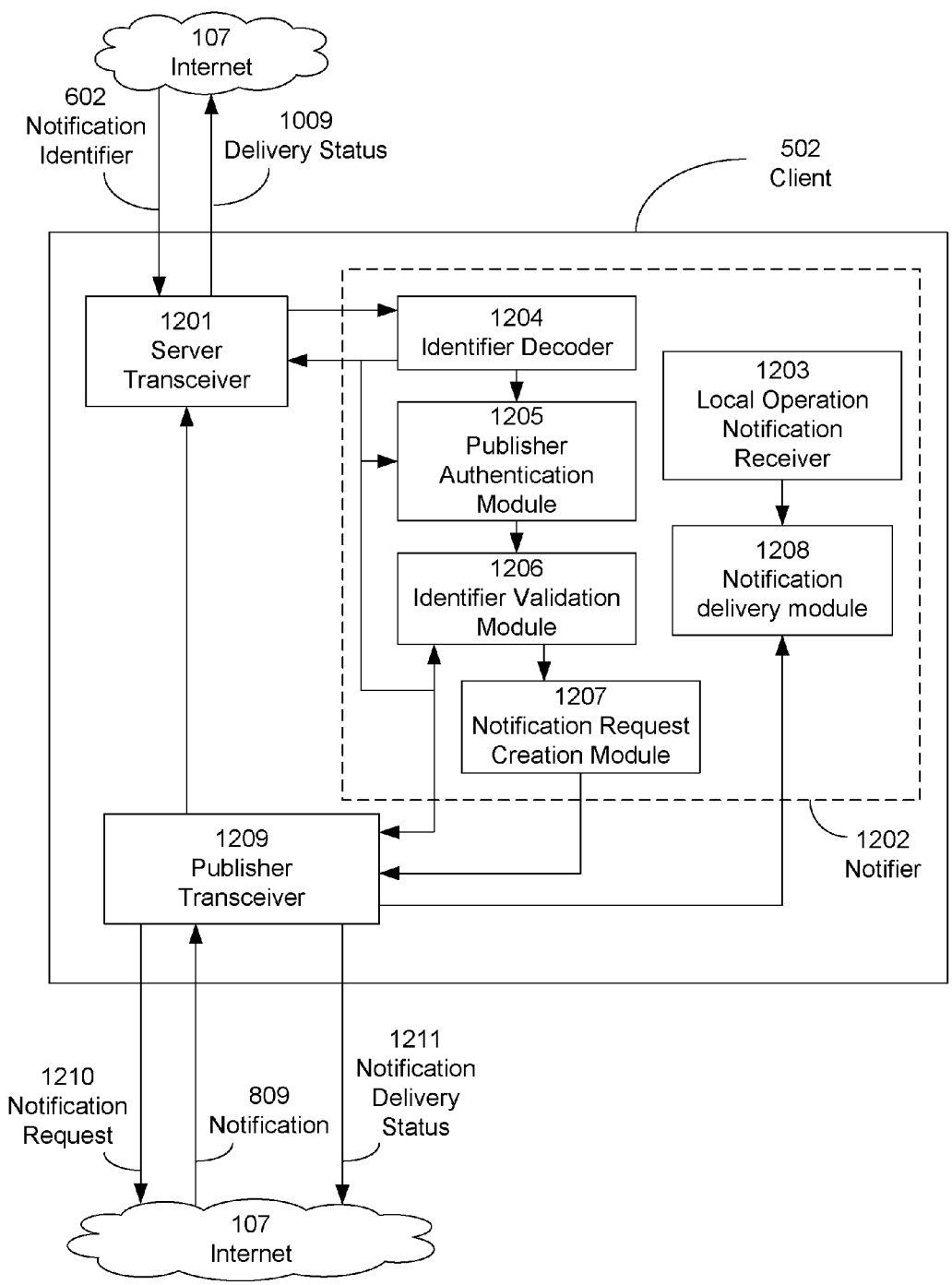
FIG. 12 shows another example client of the system illustrated in FIG. 5.
Figure 13:
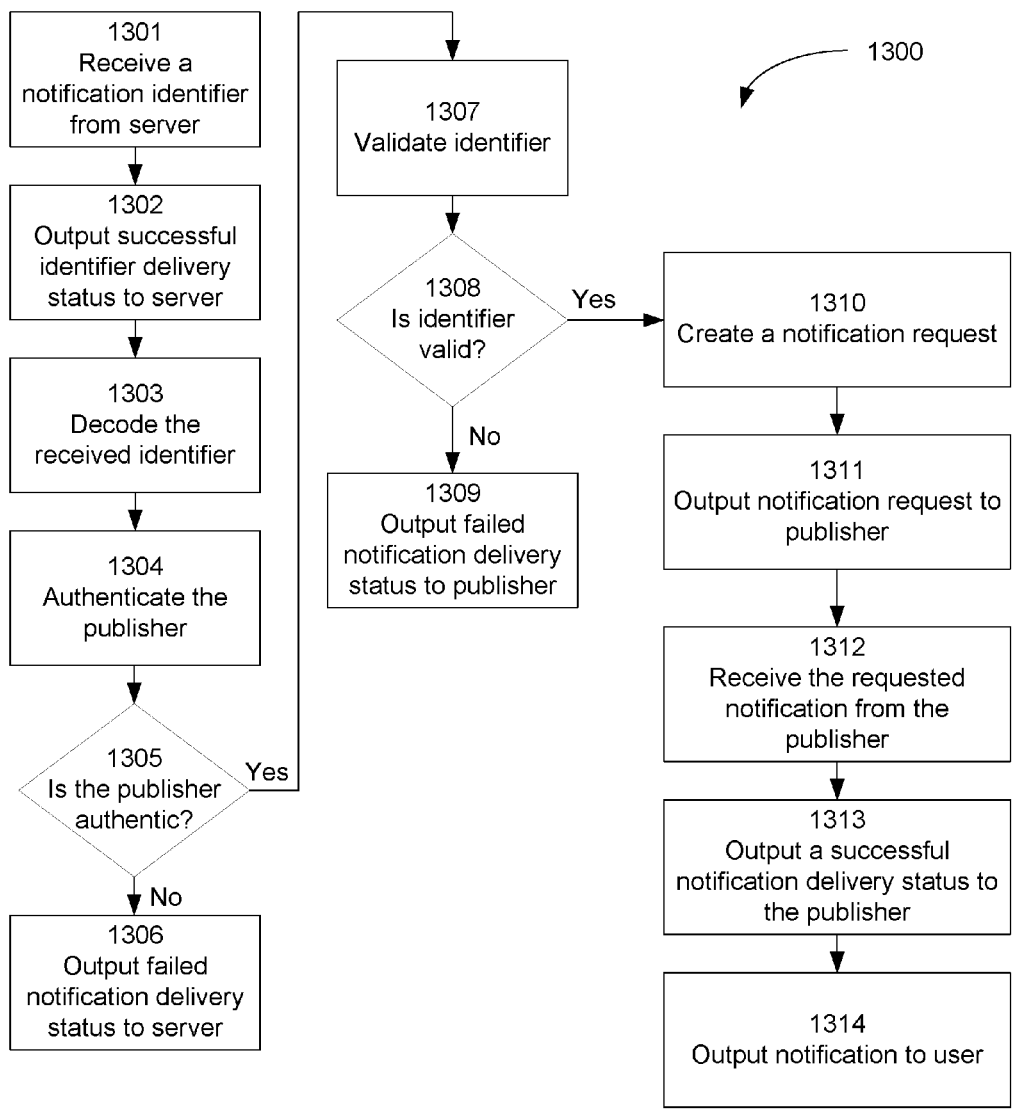
FIG. 13 illustrates an exemplary method for receiving notification identifiers and requesting notifications by the client illustrated in FIG. 12.

While one embodiment of servers and clients to output and process notification identifiers has been described, other examples of servers and clients exist. For example, the server may perform fewer functions than the notification server 501 shown in FIG. 6, and the client may perform more processing of the identifier than the client 502 shown in FIG. 8. FIGS. 10 and 12 and corresponding methods in FIGS. 11 and 13 show an alternate notification server 501 and client 502, respectively, as described below.

Alternative Embodiment of Notification Server

FIG. 10 shows another example notification server 501 of the system 500 in FIG. 5. The notification server 501 in FIG. 10 performs less operations than the notification server described in FIG. 6. In one embodiment, the notification server 501 in FIG. 10 does not determine user or client preferences for notifications. Therefore, the notification server 501 delivers all received notification identifiers 602 to the intended client.

The notification server 501 in FIG. 10 may comprise a publisher transceiver 1001. The publisher transceiver 1001 may be configured to receive notification identifiers 602 from publishers via the internet 107 and send delivery statuses 1002 for notification identifiers 602 when being delivered to the intended clients. The notification server 501 may further comprise an identifier decoder 1003 to extract an identifier of the intended client 502 from the identifier.

Also included may be a client determination module 1004 for determining the client from the client identifier extracted in decoder 1003. In one embodiment, the identifier is matched with stored identifiers of clients in client database 1005. If a match is found, then the client determination module 1004 successfully identifies the client to receive the identifier. If no match is found in the database 1005, then the module 1004 does not identify the client. As a result, the client determination module may output a failed delivery status 1002 to the publisher if the client cannot be identified. In another embodiment, the client identifier includes connection information or settings so that the notification server 501 may establish a connection with the client 502.

The notification server 501 may further comprise a client availability determination module 1006. The client availability determination module 1006 may be configured to attempt to contact the client to determine if the client is available. For example, the client may be pinged, and the notification server 501 waits to receive a response to the ping. Alternatively, the notification server 501 may attempt to output all notification identifiers irrespective of whether the client is available to receive the notification identifier.

The client availability determination module 1006 may further be configured to output a failed delivery status 1002 via the publisher transceiver 1001 to the publisher. Therefore, the publisher may know that the client is unavailable to currently receive a notification identifier. In one embodiment, the notification server 501 may be configured to store the notification identifier in a buffer 1007 until the client is available. In another embodiment, the publisher resends at a later time the notification identifier to the notification server 501.

The notification server 501 may also comprise a buffer 1007 and client transceiver 1008 to store and output notification identifiers 602 to the client and receive a delivery status 1009 from the client. The notification identifier 602 therefore is not modified before transmission to the client 502. Therefore, in one embodiment, the publishers send a notification identifier in a uniform format understandable by the notification server 501 and client 502, such as XML with specific structures.

FIG. 11 illustrates an exemplary method 1100 for collecting and outputting a notification identifier by the notification server 501 in FIG. 10. In one embodiment, method 1100 may be repeated for each received notification identifier of a plurality of notification identifiers that may be received by the notification server 501. Beginning at 1101, the publisher transceiver 1001 receives a notification identifier 602 from a publisher. Proceeding to 1102, the identifier decoder 1003 decodes the received identifier. For example, the decoder 1003 may pull client information from the identifier 602. Upon pulling the client information, the client determination module may determine the intended client for receiving the identifier 602 in 1103.

Proceeding to 1104, the notification server 501 determines if the intended client is valid. For example, a client is not valid if the client determination module 1004 cannot determine the client in 1103. In another example, the client may not be valid if the client information is not up to date, possibly signaling that the client is no longer associated with the notification server 501.

If the client is not valid, then the client determination module 1004 outputs a failed delivery status 1002 to publisher in 1105. The publisher may then determine whether the client information given is correct and thus resend the notification identifier 602 to the notification server 501. If the intended client is valid in 1104, then the client availability determination module 1006 determines if the client is available to receive the identifier 602 in 1106. For example, the notification server 501 may ping the client 502 to determine if the client is connected and available.

Proceeding to 1107, if the client is not available, such as the notification server 501 does not receive a response to a ping of the client 502, the notification server 501 may output a failed delivery status 1002 to the publisher in 1105. As a result, the publisher may resend the identifier 602 at a later time. In addition, the notification server 501 may store the identifier 602 until the client 502 is available. If the client 502 is available in 1107, then the notification identifier 602 is temporarily stored in buffer 1007 in 1108. For example, the notification identifier 602 may be placed in a queue of other identifiers to be sent to clients. Proceeding to 1109, when the client transceiver 1008 is available and the notification identifier 602 is the next to be sent to an available client, the transceiver 1008 outputs the notification identifier 602 to the intended client.

Alternative Embodiment of Client

FIG. 12 shows an example client 502 of the system 500 in FIG. 5 to be connected to the notification server 501 in FIG. 10. Since the notification server 501 in FIG. 10 does not perform verification or authentication of the identifier or publisher, the client 502 may perform such authentication and verification in one embodiment. The client 502 in FIG. 12 comprises a server transceiver 1201 to receive notification identifiers 602 from the notification server 501 in FIG. 10 and output delivery status 1009 of the identifier 602 to the notification server 501.

The client 502 further comprises a notifier 1202, which may include: a local operation notification receiver 1203 to receive notification generated by the client 502; an identifier decoder 1204 to decode the identifier for information including publisher identification information and identifier validation information; a publisher authentication module 1205 to authenticate the publisher hosting the notification; and identifier validation module 1206 to determine the validity of the identifier 602; the notification request creation module 1207 to create the notification request to be sent to the publisher; and a notification delivery module 1208 to output a notification to the user of the client 502.

The client 502 may also comprise a publisher transceiver 1209 to connect the client 502 to the publisher via the internet 107 in order to output the notification request 1210. The publisher transceiver 1209 may also be configured to receive the notification 809 from the publisher and output a notification delivery status 1211 to the publisher. In one embodiment, the publisher transceiver 1209 may also output a delivery status 1002 to the notification server 501.

FIG. 13 illustrates an exemplary method 1300 for receiving a notification identifier and requesting the notification by the client 502 illustrated in FIG. 12. In one embodiment, method 1300 may be repeated for each received notification identifier of a plurality of notification identifiers that may be received by the client 502. Beginning at 1301, the server transceiver 1201 receives a notification identifier 602 from the notification server 501. Upon receiving the notification identifier 602 from the notification server 501, the server transceiver 1201 may output a delivery confirmation 1202 in 1302 to identify that the identifier 602 was successfully delivered. In one embodiment, if the identifier 602 partially is received or the transmission is interrupted before completion, the server transceiver 1201 may output a failed delivery status 1202 to the notification server 501. As a result, the notification server 501 may resend the notification identifier 602.

Proceeding to 1303, the identifier decoder 1204 of the notifier 1202 decodes the received identifier. In one embodiment, the decoder 1204 may extract information to identify and authenticate the publisher and information to validate the identifier. If any information is missing during decode, in one embodiment, the identifier decoder 1204 may output a failed delivery status to the notification server 501 via the server transceiver 1201. In addition, the decoder 1204 may convert the format of the identifier so that other modules may comprehend the received information.

Upon decoding the identifier 602 in 1303, the publisher authentication module 1205 determines the authenticity of the publisher in 1304. In one embodiment, the publisher authentication module 1205 may determine the identity of the publisher and determine if the publisher has permission to connect to the client 502 to send the notification 809. For example, the information may include connection settings for the publisher. Therefore, the client may match the connection settings to a stored list of connection settings for approved publishers. Alternatively, a publisher identifier may be matched with banned or approved publishers in order to find a match. In one embodiment, the publisher identifier may be a certificate generated by the publisher and included in the notification identifier 602. The client 502 may include a mechanism to regenerate or check the certificate for its validity. In another embodiment, the client 502 may ping the publisher and await a specific response. If no response is received, module 1205 may determine that the publisher is not authentic.

If the publisher is not authentic in 1305, then the publisher authentication module 1205 outputs a failed delivery status 1009 to the notification server 501 in 1306. If the publisher is authentic in 1305, then the identifier validation module 1206 may determine the validity of the identifier 602 in 1307. In one embodiment, module 1206 may determine if the user wishes to receive the specific type of notification by checking settings predetermined by the user. The module 1206 may also determine if the identifier is malware or other harmful code in determining the validity of the identifier.

If the identifier 602 is not valid in 1308, then the identifier validation module 1206 may output a failed notification delivery status 1211 to the publisher in 1309. For example, if the user does not wish to receive advertisements, identifiers 602 for promotional notifications may be rejected by the client 502. As such, upon receiving the failed notification delivery status 1211 from the client 502, the publisher may update its records so as not to output further notifications or notification types to the client 502. In one embodiment, a failed delivery status 1009 may be sent to the notification server 501.

If the identifier 602 is valid in 1308, then the notification request creation module 1207 may create a notification request in 1310. The notification request creation module may also bundle the connection settings to the publisher transceiver 1209 so that the transceiver 1209 may connect to the publisher in order to receive the notification 809. Proceeding to 1311, the notification request 1210 is then sent to the publisher by the publisher transceiver 1209.

Upon outputting the notification request 1210 to the publisher in 1311, the publisher transceiver 1209 receives the requested notification 809 from the publisher in 1312. In one embodiment, if the transmission of the notification 809 is interrupted or only partially received, the publisher transceiver 1209 may output a failed notification delivery status 1211 to the publisher. The publisher may then resend the notification 809 to the client 502 or the client 502 may attempt to repair the connection between the publisher and the client 502. In another embodiment, if the publisher transceiver 1209 does not receive the notification 809 in a predetermined amount of time, the publisher transceiver 1209 outputs a failed notification delivery status 1211 to the publisher and/or to the notification server 501.

Proceeding to 1313, the publisher transceiver 1209 outputs a notification delivery confirmation 1211 to the publisher upon receiving the requested notification 809. The notification 809 is then delivered to the user by the notification delivery module 1208 in 1314. In one embodiment, a graphical representation of the notification is presented to the user in order to notify the user of news from the publisher. For example, a pop-up window, plain text, markup language text, icons, animations, or other objects may be presented to the user in order to notify the user. The same presentation mechanism of the notification delivery module 1208 may also be used for internal notifications generated by the client 502 and received by the local operation notification receiver 1203.

Illustrative Embodiment of Notifier on Client

For clients such as desktop or laptop computers, personal digital assistants, and communication devices with graphical user interfaces, a graphical operating system may be running on the client. One example operating system is a windowed operating system ran on many computing devices. A runtime environment is executed by an operating system on many clients. For example, animation or programming runtime environments may be ran in the background of an operating system.

In one embodiment, the notifier is an application executed in the runtime environment on the operating system of the client. As a result, changes to the notifier may be made through software updates so that the notifier may include more functionality than originally included.

Figure 14:
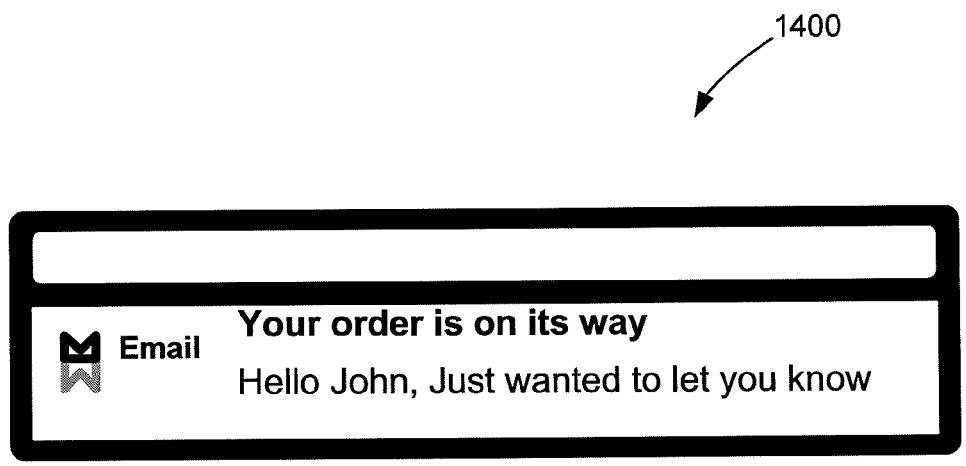
FIG. 14 illustrates a snapshot of an example notification presented by the notifier of the client to a user.

In one embodiment, the notifier continuously runs as a process of the operating system. Therefore, the notifier may always be available to process a notification or identifier. For example, the notifier may place an icon in the taskbar of a windowed operating environment. Therefore, as a result, a window may pop-up from the icon when a notification is received. FIG. 14 illustrates an example notification 1400 presented to a user by the notifier. The example notification 1400 is a webmail notification that may be a pop-up window when the notification is received. The same type of notification as notification 1400 may also originate from the retail chain outputting the webmail. The notification may be clicked on by the user, which may open a web browser to connect to a publisher or retail store's website. In another embodiment, the user may hover a pointer over the notification in order to receive more information from the notification (for example, expanding the pop-up window to include more information).

The icon placed into the taskbar may also replace other icons that would simultaneously reside in the taskbar. For example, anti-virus software icons, hardware supervisor icons, and instant messaging icons may be replaced with a notifier icon, wherein the notifier delivers notifications from such applications to the user. The notifier may then link the user to the appropriate application in response to user input to the notification (for example, a mouse click or keystroke).

Figure 15:
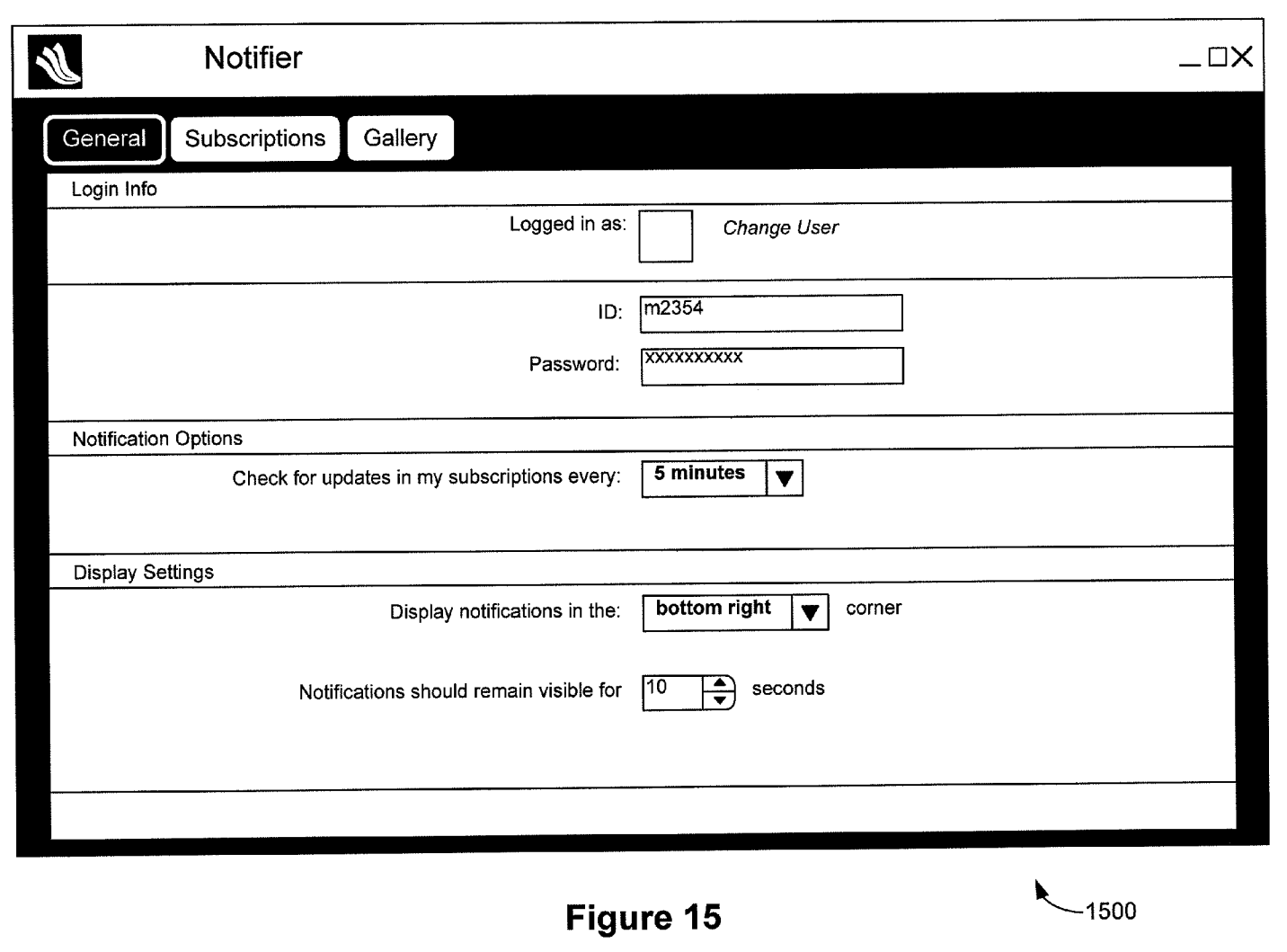

Multiple parameters of the notifier may be changed by a user of the client running the notifier. FIG. 15 illustrates an example parameter dialog 1500 with a user in order for a user to change parameters of the notifier. For example, the notifier may be set to output notifications for one user. Hence, the notifier may be managed so as to output notifications for a different user. For example, one user may be logged out of the notifier and a different user may be logged into the notifier. In another embodiment, the notifier may be set to engage the notification server to actively search if updates have been made to specified publishers. The user may set the notifier to engage the server every five minutes, fifteen minutes, or other time interval. The user may also set how the notifications are to be presented to the user, including positioning and length of display of the notification.

Another parameter that may be modified by a user include subscriptions, wherein the user may set which publishers are authorized to contact the user or which publishers are banned. The user may also modify the parameter of the type of notifications to be delivered. For example, promotional notifications may be selected to be banned by the user.

In one embodiment, a parameter that may be altered by the user is delivery of summary reports of notifications not delivered to the client by the notification server. For example, ten notifications may not be delivered to a client through notifier parameters or the client was not connected to the notification server. Therefore, the notification server may bundle the undelivered notifications into a summary report presented to the user so that the user may view if any notifications are of interest. The user may modify the frequency, length, or format of the summary reports.

In addition, another parameter that may be altered by the user is delivery of summary reports of notifications delivered to the client. For example, all of the notifications delivered to a client during a day may be package into a summary report for the client. In another embodiment, a summary report may be created for all messages or select messages, both delivered and undelivered, intended for the client. The user may modify the frequency, length, or format of the summary reports.

When the user modifies the parameters of the notifier, the modifications may be sent to the notification server in order to update the client database that may store the client or user preferences. Therefore, the notification server may begin filtering notifications in response to the modifications made by the user. In addition, plug-ins may be sent to and installed in the notifier in response to the modifications from the user.

In addition or alternative to modifying notifier parameters by a local application on the client, the user may modify parameters of the notifier through a publisher's website or by accessing the notification server. For example, a user may elect to receive notifications from a publisher by clicking on a special link on the publisher's website, which is sent to the notification server in order to update the user or client preferences.

In addition to the above functionality for the notifier, the notifier may also be able to store notifications so that they may be viewed by a user at a later point in time. Furthermore, a notification may be broadcast to multiple clients of a user in order to reach the user wherever the user may be. For example, a notification may be sent to a mobile telephone, home laptop, and work desktop.

Illustrative Analytics Collected From Clients

Promotional notifications are one type of notifications that may be delivered to a client. Hence, in one embodiment, the notification server and client notifiers may collect analytics in addition to outputting notifications to users in order to determine the effectiveness of such promotional notifications. Analytics is information regarding a notification that may be used to determine the effectiveness of a notification. In one embodiment, analytics is a collection or summary of user inputs in response to a notification sent to the user clients. For example, when a notification is delivered to a user, the notifier may record information such as a pointer click on a graphical representation of the notification, an amount of time the pointer is positioned over the graphical representation of the notification, amount of program activity on the client when the graphical representation is being displayed (i.e., how much attention is the user paying to the notification), a user ranking as to the importance of the notification (e.g., a thumbs up or thumbs down indication by the user), and the amount of time between the graphical representation being displayed and the user closing the graphical representation.

The collected information may be sent by the notifier to the notification server, wherein the data may be aggregated from multiple clients receiving the same or similar notifications. The information may then be reviewed and bundled into analytics to be sent to the publisher of the notification. One example analytic is the relative ranking of success of a notification compared to other notifications sent by the publisher or other publishers. Another example analytic is the percentage of users willing to receive the notification or who responded favorably to the notification.

Illustrative Server to Collect Analytics

Figure 16:
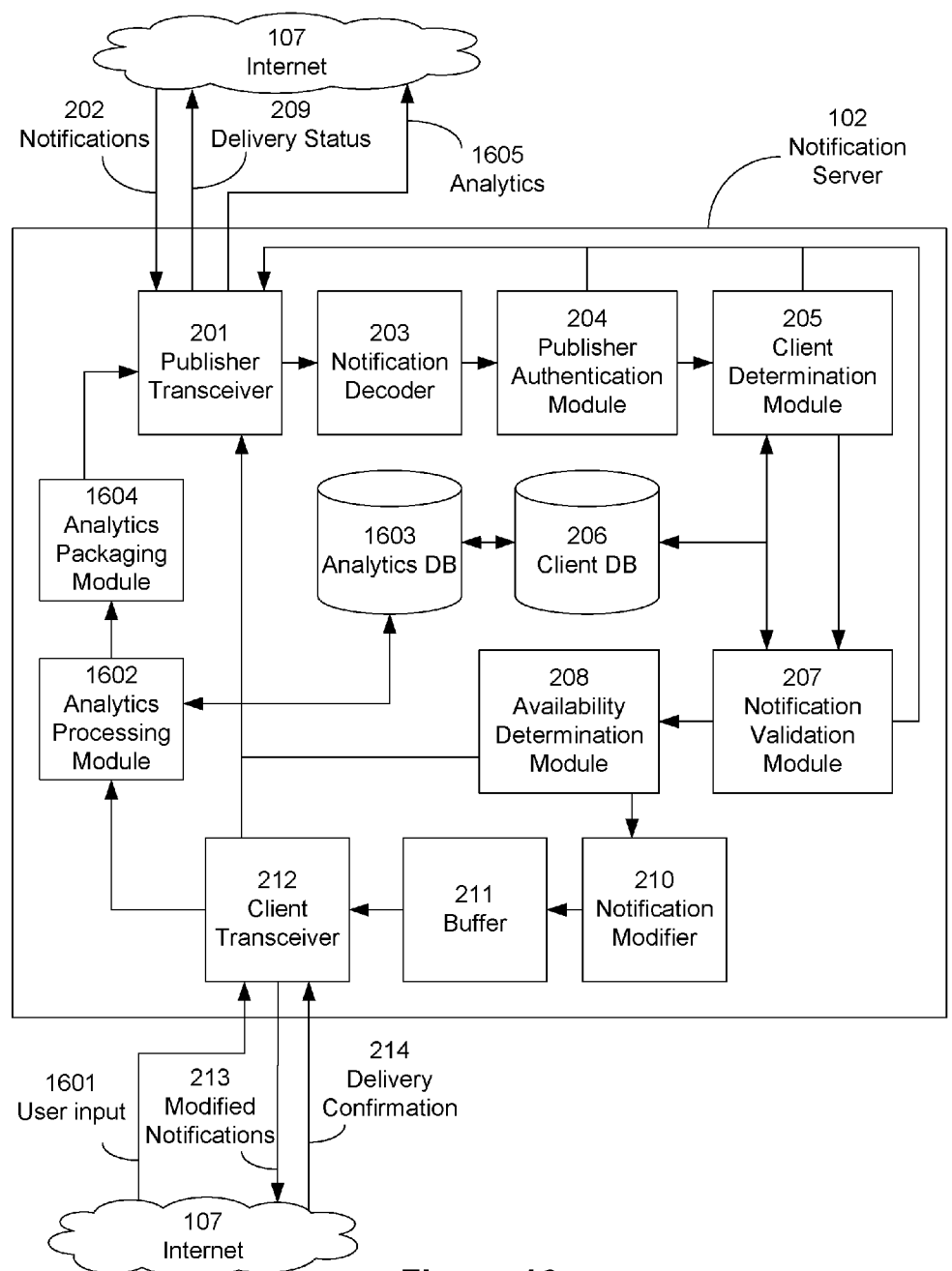
FIG. 16 shows an exemplary notification server of the system illustrated in FIG. 1 for creating analytics of the notifications sent to clients.

FIG. 16 shows an exemplary notification server 102 of the system 100 illustrated in FIG. 1 for creating analytics of the notifications sent to clients 101. In one embodiment, the notification server 102 comprises an analytics processing module 1602 to receive user input 1601 from the client in response to notifications 213 being sent to the clients. The analytics processing module may analyze the receive inputs 1601 in order to create analytics of importance to publishers or the notification server.

The notification server 102 further comprises an analytics database 1603 to store the aggregated user inputs 1601 or analytics of the aggregated user inputs 1601. In one embodiment, the analytics database 1603 may be connected to the client database 206 so that user inputs from a specific user may affect the user preferences in the client database 206. For example, if a user repeatedly gives negative feedback on a publisher as an input 1601, the notification server 102 may change the preferences of the user so that the user is not to receive any more notifications from the publisher.

In addition, user preferences in the client database 206 may be used to create analytics. For example, the processing module 1602 may determine the percentage of users or clients blocking a specific publisher. The notification server also may comprise an analytics packaging module 1604 to package the analytics 1605 to be sent to the publisher.

Figure 17:
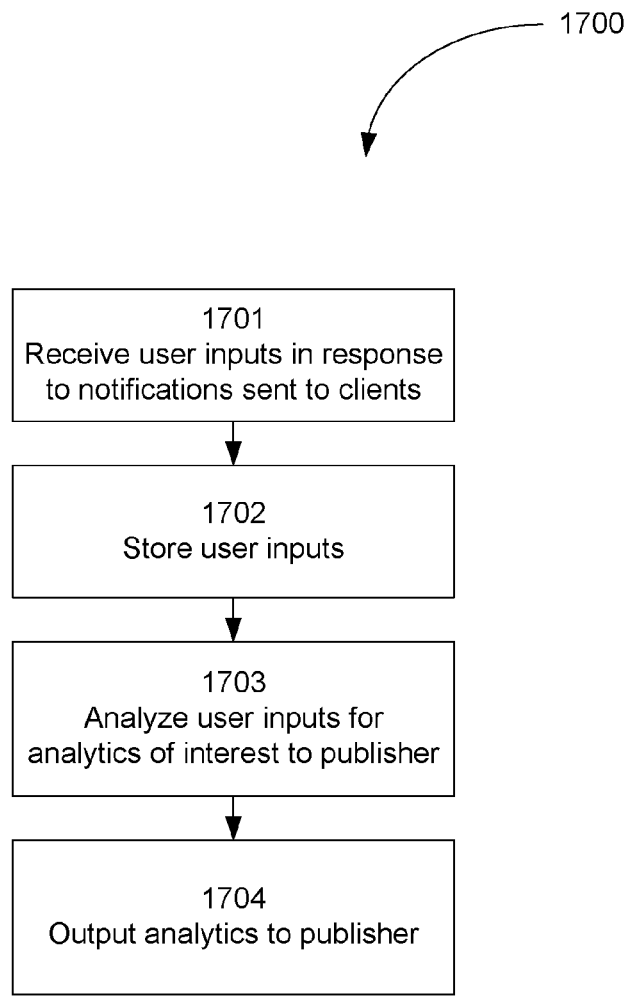
FIG. 17 illustrates an exemplary method for creating analytics by the notification server in FIG. 16.

FIG. 17 illustrates an exemplary method 1700 for creating analytics by the notification server 102 in FIG. 16. Beginning at 1701, the analytics processing module 1602 receives user inputs 1601 from clients receiving notifications from the notification server 102. Upon receiving the user inputs 1601, the analytics processing module may store the user inputs in the analytics database 1603 in 1702. In another embodiment, the analytics processing module may modify analytics stored on the analytics database 1603 using the received user inputs 1601. For example, a running total of users approving of a notification or clicking on the notification may be updated when new user inputs 1601 are received for the notification.

Proceeding to 1703, the analytics processing module 1602 may analyze the user inputs for analytics of importance to the publisher. For example, the processing module 1602 may determine the relative order of importance of a notification compared to others, such as the highest approved notification, the notification that was most clicked, and the notification that was viewed by the most users. Upon creating the analytics from the user inputs in 1703, the analytics packaging module may package and output the analytics 1605 to a publisher in 1704. In one embodiment, the analytics may be used by the publisher to determine the notification's effectiveness.

Pricing Structures for Notification Delivery in View of Analytics

In addition or alternative to the analytics determining notification effectiveness, analytics may be used in order to determine cost of outputting notifications to a user. For example, while a publisher may be billed for the number of notifications delivered to clients, the publisher alternatively may be billed for the number of notifications clicked on by users. For example, if 10,000 notifications were delivered by a notification server 102, but only 350 notifications were clicked by users, then the publisher may be billed for the 350 notifications.

Furthermore, analytics may be used to determine the maximum number of promotional notifications that may be delivered with satisfactory approval to users. As a result, publishers may bid for limited number of notification slots. In another embodiment, publishers may be apportioned a number of notifications to be delivered based on the approval or popularity of the publisher.

Exemplary Computer Architecture for Implementation of Systems and Methods

Figure 18:
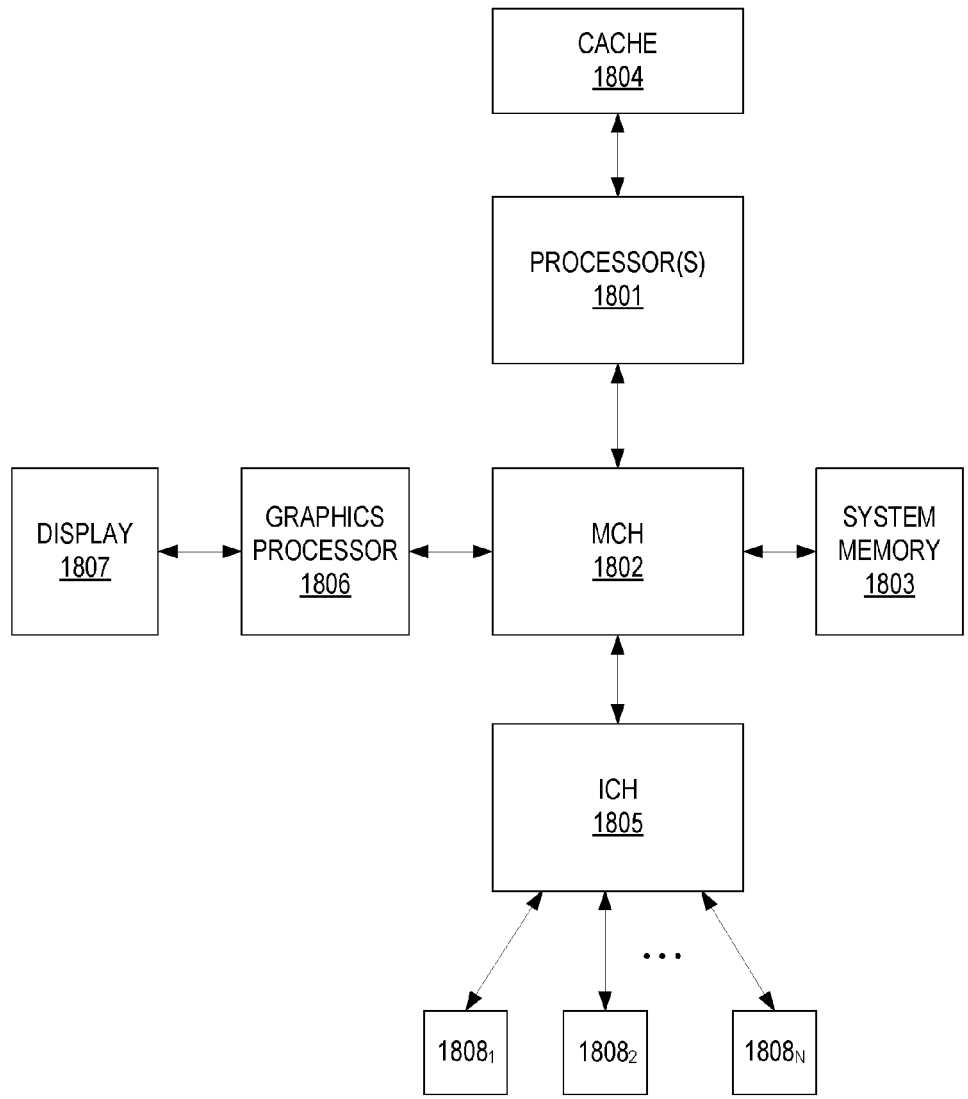
FIG. 18 illustrates an exemplary computer architecture for implementation of the example devices of FIGS. 2, 6, 8, 10, 12, and 16 and execution of the example methods of FIGS. 3-4, 7, 9, 11, 13, and 17.

FIG. 18 illustrates an example computer architecture for implementing a server and/or client as described in FIGS. 2-4, 6-13, and 16-17. The exemplary computing system of FIG. 18 includes: 1) one or more processors 1801; 2) a memory control hub (MCH) 1802; 3) a system memory 1803 (of which different types exist such as DDR RAM, EDO RAM, etc,); 4) a cache 1804; 5) an I/O control hub (ICH) 1805; 6) a graphics processor 1806; 7) a display/screen 1807 (of which different types exist such as Cathode Ray Tube (CRT), Thin Film Transistor (TFT), Liquid Crystal Display (LCD), DPL, etc.); and/or 8) one or more I/O devices 1808.

The one or more processors 1801 execute instructions in order to perform whatever software routines the computing system implements. The instructions frequently involve some sort of operation performed upon data. Both data and instructions are stored in system memory 1803 and cache 1804. Cache 1804 is typically designed to have shorter latency times than system memory 1803. For example, cache 1804 might be integrated onto the same silicon chip(s) as the processor(s) and/or constructed with faster SRAM cells whilst system memory 1803 might be constructed with slower DRAM cells. By tending to store more frequently used instructions and data in the cache 1804 as opposed to the system memory 1803, the overall performance efficiency of the computing system improves.

System memory 1803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1803 prior to their being operated upon by the one or more processor(s) 1801 in the implementation of a software program. Similarly, data that a software program determines should be sent from the computing system to an outside entity through one of the computing system interfaces, or stored into an internal storage element, is often temporarily queued in system memory 1803 prior to its being transmitted or stored.

The ICH 1805 is responsible for ensuring that such data is properly passed between the system memory 1803 and its appropriate corresponding computing system interface (and internal storage device if the computing system is so designed). The MCH 1802 is responsible for managing the various contending requests for system memory 1803 access amongst the processor(s) 1801, interfaces and internal storage elements that may proximately arise in time with respect to one another.

One or more I/O devices 1808 are also implemented in a typical computing system. I/O devices generally are responsible for transferring data to and/or from the computing system (e.g., a networking adapter); or, for large scale non-volatile storage within the computing system (e.g., hard disk drive). ICH 1805 has bi-directional point-to-point links between itself and the observed I/O devices 1808.

Referring back to FIGS. 3, 7, 9, 11, 13, and 16 modules of the different embodiments of the described system may include software, hardware, firmware, or any combination thereof. The modules may be software programs available to the public or special or general purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 3-4, 7, 9, 11, 13, and 17, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented. For example, while it has been described of having two transceivers in a device, one transceiver may be used to connect to a publisher and notification server or publisher and client. In another example, the transceiver may be a receiver such that no feedback or status is given to the outputting party.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:
1. A computer-implemented method, comprising:
receiving, by a notification server, a first plurality of inputs for a first notification, wherein each of the first plurality of inputs indicates a respective amount of interaction with the first notification by a respective client receiving the first notification responsive to the notification server delivering the first notification to the respective client receiving the first notification;

receiving, by the notification server, a second plurality of inputs for a second notification, wherein each of the second plurality of inputs indicates a respective amount of interaction with the second notification by a respective client receiving the second notification responsive to the notification server delivering the second notification to the respective client receiving the second notification; and determining, by the notification server, an analytic evaluating the first notification in reference to the second notification, wherein the analytic is determined using the first plurality of inputs and the second plurality of inputs;

wherein determining the analytic comprises comparing the first plurality of inputs representing rankings of the first notification with the second plurality of inputs representing rankings of the second notification.

2. The computer-implemented method of claim 1, wherein the analytic describes a relative order of importance between the first notification and the second notification.

3. The computer-implemented method of claim 1, further comprising:
determining, by the notification server, a first amount to charge a first publisher of the first notification for providing the first notification based on the analytic; and
determining, by the notification server, a second amount to charge a second publisher of the second notification for providing the second notification based on the analytic.

4. The computer-implemented method of claim 1, wherein the first notification is from a first publisher and the second notification is from a second publisher, and further comprising:
apportioning, by the notification server, a first number of additional notifications from the first publisher to be delivered by the notification server based on the analytic; and
apportioning, by the notification server, a second number of additional notifications from the second publisher to be delivered by the notification server based on the analytic.

5. The computer implemented method of claim 1, wherein determining the analytic comprises:
aggregating the first plurality of inputs into a first aggregate input;
aggregating the second plurality of inputs into a second aggregate input; and
comparing the first aggregate input with the second aggregate input.

6. The computer implemented method of claim 5,
wherein each of the first plurality of inputs comprises a respective amount of time a respective pointer at the respective client receiving the first notification is positioned over a first graphical representation of the first notification;
wherein each of the second plurality of inputs comprises a respective amount of time a respective pointer at the respective client receiving the second notification is positioned over a second graphical representation of the second notification;
wherein comparing the first aggregate input with the second aggregate input comprises comparing a first aggregate amount of time obtained from the first plurality of inputs and a second aggregate amount of time obtained from the second plurality of inputs.

7. The computer implemented method of claim 5,
wherein each of the first plurality of inputs comprises a respective amount of time a first graphical representation of the first notification is active at the respective client receiving the first notification;
wherein each of the second plurality of inputs comprises a respective amount of time a second graphical representation of the second notification is active at the respective client receiving the second notification;
wherein comparing the first aggregate input with the second aggregate input comprises comparing a first aggregate amount of time obtained from the first plurality of inputs and a second aggregate amount of time obtained from the second plurality of inputs.

8. The computer implemented method of claim 1, wherein determining the analytic comprises comparing the first plurality of inputs representing decisions to block a first publisher of the first notification with the second plurality of inputs representing decisions to block a second publisher of the second notification.

9. The computer implemented method of claim 1, further comprising providing the analytic to a first publisher of the first notification and to a second publisher of the second notification.

10. The computer implemented method of claim 1, further comprising:
receiving, by the notification server, a plurality of notifications for a client from a plurality of publishers, wherein each notification of the plurality of notifications comprises a client identifier and a notification type identifier; and
for each notification of the plurality of notifications:
authenticating, by the notification server, a publisher of the notification upon receiving the notification;
determining, by the notification server, that the client is subscribed to receive a type of notification identified by the notification type identifier from the publisher of the notification; and
outputting, by the notification server, the notification to the client based on authenticating the publisher and determining that the client is subscribed to receive the type of notification from the publisher.

11. The computer-implemented method of claim 1,
wherein each of the first plurality of inputs comprises a respective amount of activity by at least one application other than an application rendering a first graphical representation of the first notification at the respective client receiving the first notification during the rendering of the first graphical representation at the respective client receiving the first notification; and
wherein each of the second plurality of inputs comprises a respective amount of activity by at least one application other than an application rendering a second graphical representation of the second notification at the respective client receiving the second notification during the rendering of the second graphical representation at the respective client receiving the second notification.

12. The computer-implemented method of claim 1,
wherein each of the first plurality of inputs comprises a respective amount of time a first graphical representation of the first notification is rendered at the respective client receiving the first notification prior to the first graphical representation being closed in response to input received at the respective client receiving the first notification; and wherein each of the second plurality of inputs comprises a respective amount of time a second graphical representation of the second notification is rendered at the respective client receiving the second notification prior to the second graphical representation being closed in response to input received at the respective client receiving the second notification.

13. The computer-implemented method of claim 1, wherein at least two of the first plurality of inputs indicate different amounts of interaction with the first notification by at least two clients receiving the first notification;

wherein at least two of the second plurality of inputs indicate different amounts of interaction with the second notification by at least two clients receiving the second notification.

14. A notification server comprising:

a processor for executing instructions stored in a non-transitory computer-readable medium on one or more devices providing an application;

wherein the application comprises one or more modules configured to perform operations comprising:

receiving a first plurality of inputs for a first notification, wherein each of the first plurality of inputs indicates a respective amount of interaction with the first notification by a respective client receiving the first notification responsive to the notification server delivering the first notification to the respective client receiving the first notification;

receiving a second plurality of inputs for a second notification, wherein each of the second plurality of inputs indicates a respective amount of interaction with the second notification by a respective client receiving the second notification responsive to the notification server delivering the second notification to the respective client receiving the second notification; and determining an analytic evaluating the first notification in reference to the second notification, wherein the analytic is determined using the first plurality of inputs for the first notification and the second plurality of inputs for the second notification;

wherein the one or more modules are configured to perform additional operations comprising:

determining, based on the analytic, a first amount to charge the first publisher for providing the first notification; and determining, based on the analytic, a second amount to charge the second publisher for providing the second notification based on the analytic.

15. The notification server of claim 14, wherein the one or more modules are configured to determine the analytic by:

aggregating the first plurality of inputs from the plurality into a first aggregate input, aggregating the second plurality of inputs from the plurality into a second aggregate input, and comparing the first aggregate input with the second aggregate input; and wherein the one or more modules are configured to provide the analytic to a first publisher of the first notification and to a second publisher of the second notification.

16. The notification server of claim 15, wherein each of the first plurality of inputs comprises a respective amount of time a respective pointer at the respective client receiving the first notification is positioned over a first graphical representation of the first notification;

wherein each of the second plurality of inputs comprises a respective amount of time a respective pointer at the respective client receiving the second notification is positioned over a second graphical representation of the second notification;

wherein comparing the first aggregate input with the second aggregate input comprises comparing a first aggregate amount of time obtained from the first plurality of inputs and a second aggregate amount of time obtained from the second plurality of inputs.

17. The notification server of claim 15, wherein the one or more modules are configured to perform additional operations comprising:

receiving a plurality of notifications for a client from a plurality of publishers, wherein each notification of the plurality of notifications comprises a client identifier and a notification type identifier; and for each notification of the plurality of notifications:

authenticating a publisher of the notification upon receiving the notification;

determining that the client is subscribed to receive a type of notification identified by the notification type identifier from the publisher of the notification; and outputting the notification to the client based on authenticating the publisher and determining that the client is subscribed to receive the type of notification from the publisher.

18. A non-transitory computer-readable medium on which is encoded program code, comprising:

program code for receiving a first plurality of inputs for a first notification, wherein each of the first plurality of inputs indicates a respective amount of interaction with the first notification by a respective client receiving the first notification responsive to a notification server delivering the first notification to the respective client receiving the first notification;

program code for receiving a second plurality of inputs for a second notification, wherein each of the second plurality of inputs indicates a respective amount of interaction with the second notification by a respective client receiving the second notification responsive to the notification server delivering the second notification to the respective client receiving the second notification;

program code for determining an analytic evaluating the first notification in reference to the second notification, wherein the analytic is determined using the first plurality of inputs and the second plurality of inputs;

program code for determining a first amount to charge a first publisher of the first notification for providing the first notification based on the analytic; and program code for determining a second amount to charge a second publisher of the second notification for providing the second notification based on the analytic.

19. The computer readable medium of claim 18, further comprising:

program code for receiving a plurality of notifications for a client from a plurality of publishers, wherein each notification of the plurality of notifications comprises a client identifier and a notification type identifier; and program code for, for each notification of the plurality of
notifications, performing operations comprising:
authenticating a publisher of the notification upon
receiving the notification;
determining that the client is subscribed to receive a
type of notification identified by the notification type
identifier from the publisher of the notification; and
outputting the notification to the client based on authenticating the publisher and determining that the client is
subscribed to receive the type of notification from the
publisher.

20. A computer-implemented method, comprising:
receiving, by a notification server, a first plurality of
inputs for a first notification, wherein each of the first
plurality of inputs indicates a respective amount of
attention directed to the first notification by a respective
client receiving the first notification;
receiving, by the notification server, a second plurality of
inputs for a second notification, wherein each of the
second plurality of inputs indicates a respective amount
of attention directed to the second notification by a
respective client receiving the second notification; and
determining, by the notification server, an analytic evaluating the first notification in reference to the second
notification, wherein the analytic is determined using
the first plurality of inputs and the second plurality of
inputs.

* * * * *